Nov. 12, 1963    W. W. BUNTING, JR., ETAL    3,110,151
PROCESS FOR PRODUCING COMPACT INTERLACED YARN
Filed May 26, 1961                    8 Sheets-Sheet 1
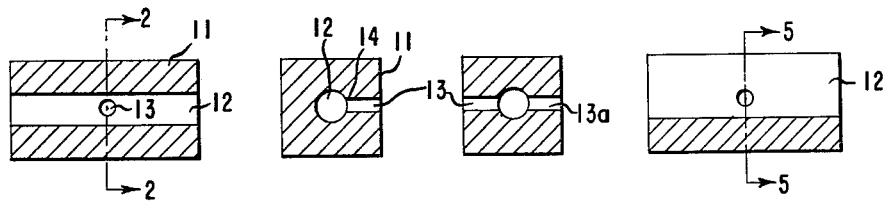
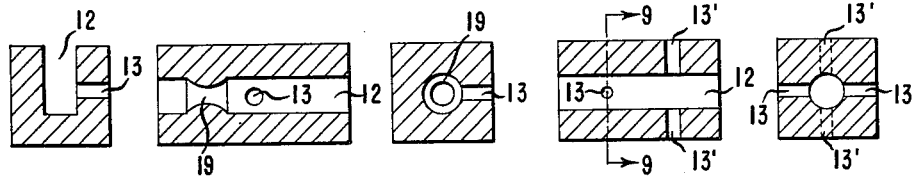
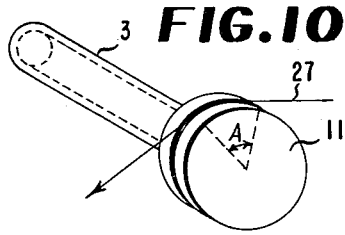
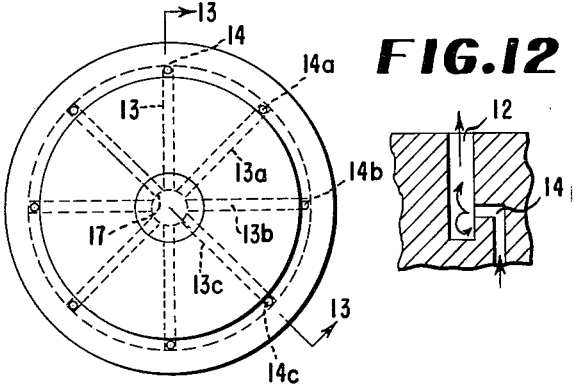
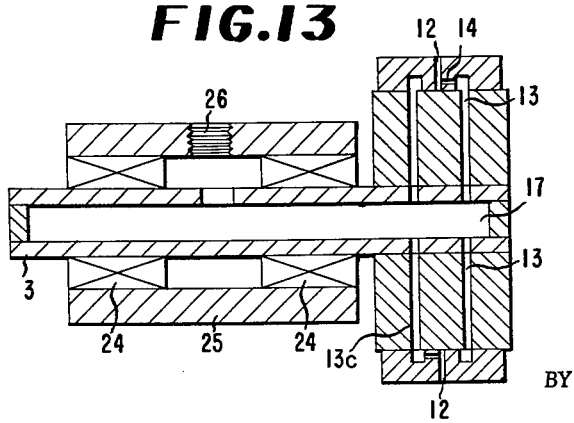
INVENTORS
WILLIAM WALLAR BUNTING, JR.
THOMAS LARSON NELSON
BY
ATTORNEY

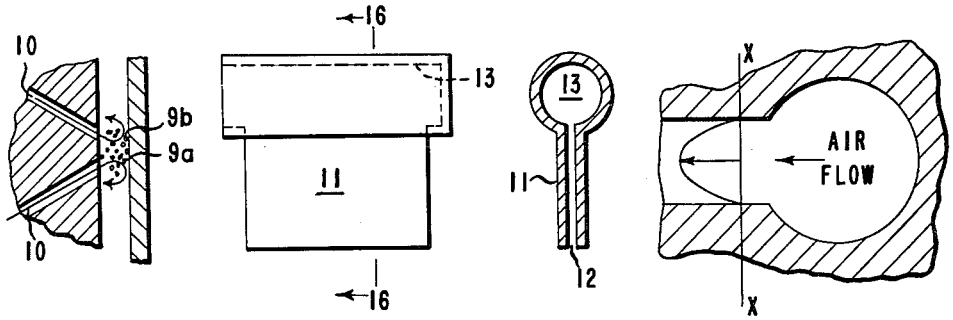
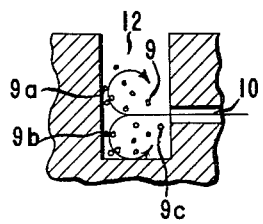
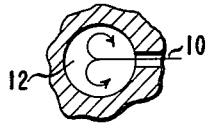
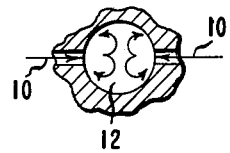
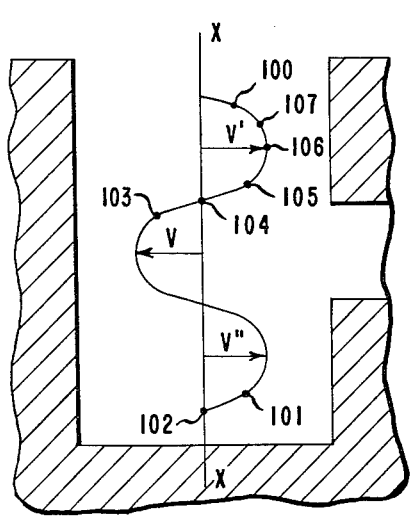
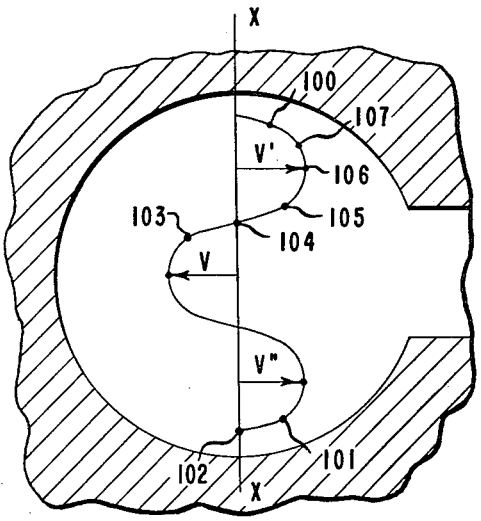
INVENTORS
WILLIAM WALLAR BUNTING JR.
THOMAS LARSON NELSON Nov. 12, 1963  W. W. BUNTING, JR., ETAL  3,110,151
PROCESS FOR PRODUCING COMPACT INTERLACED YARN
Filed May 26, 1961  8 Sheets-Sheet 3
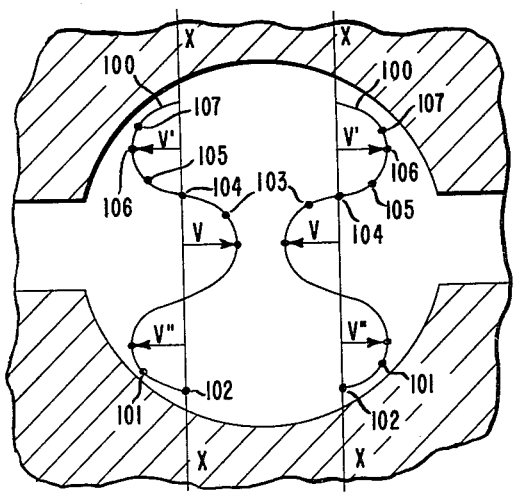
FIG. 23
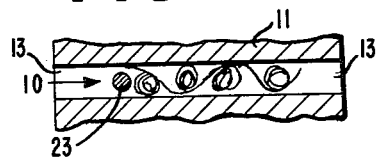
FIG. 24
FIG. 25
FIG. 26
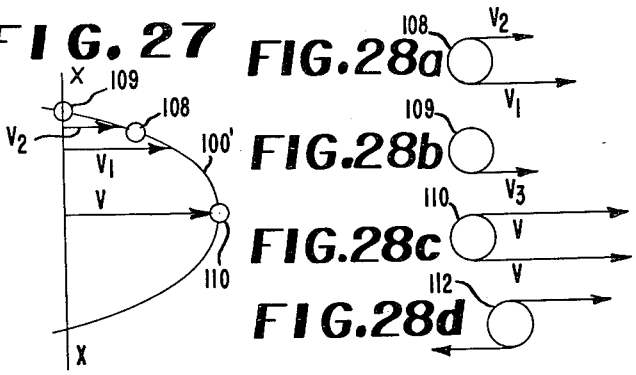
FIG. 27  FIG. 28a  FIG. 28b  FIG. 28c  FIG. 28d
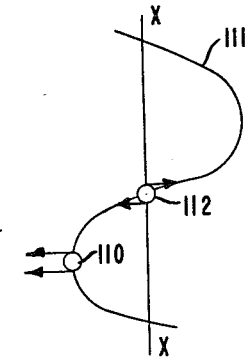
FIG 29
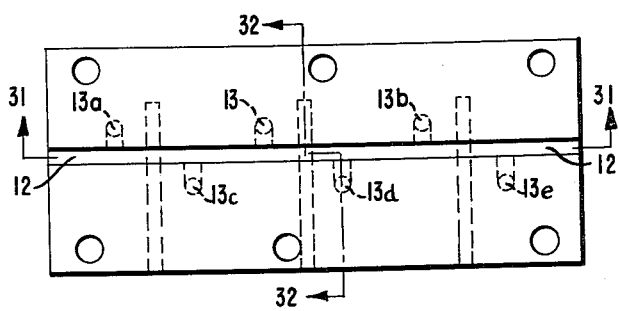
FIG. 30
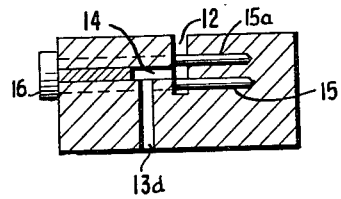
FIG. 32
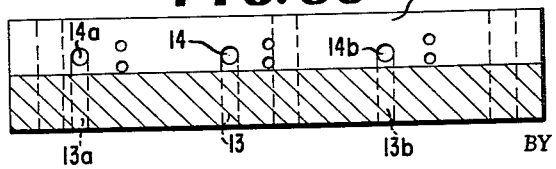
FIG. 31
INVENTORS
WILLIAM WALLAR BUNTING, JR.
THOMAS LARSON NELSON
BY *Norris E. Ruckman*
ATTORNEY

FIG. 33  FIG. 34  FIG. 35
FIG. 36  FIG. 37  FIG. 38
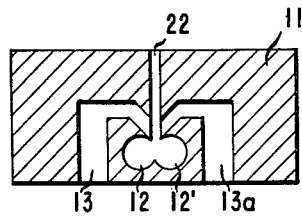
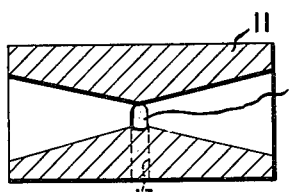
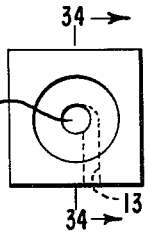
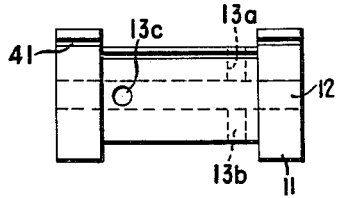
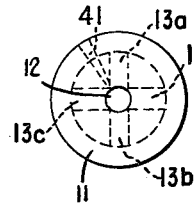
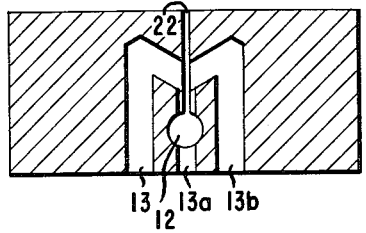
FIG. 39  FIG. 40
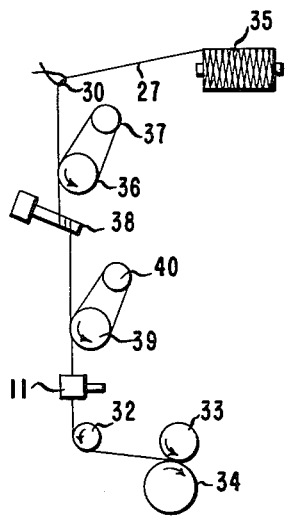
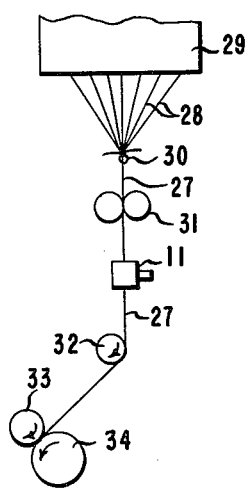
INVENTORS
WILLIAM WALLAR BUNTING JR
THOMAS LARSON NELSON
ATTORNEY Nov. 12, 1963   W. W. BUNTING, JR., ETAL   3,110,151
PROCESS FOR PRODUCING COMPACT INTERLACED YARN
Filed May 26, 1961   8 Sheets-Sheet 5

INVENTORS
WILLIAM WALLAR BUNTING JR.
THOMAS LARSON NELSON

BY *Norris E. Ruckman*
ATTORNEY

Nov. 12, 1963  W. W. BUNTING, JR., ETAL  3,110,151
PROCESS FOR PRODUCING COMPACT INTERLACED YARN
Filed May 26, 1961  8 Sheets-Sheet 6
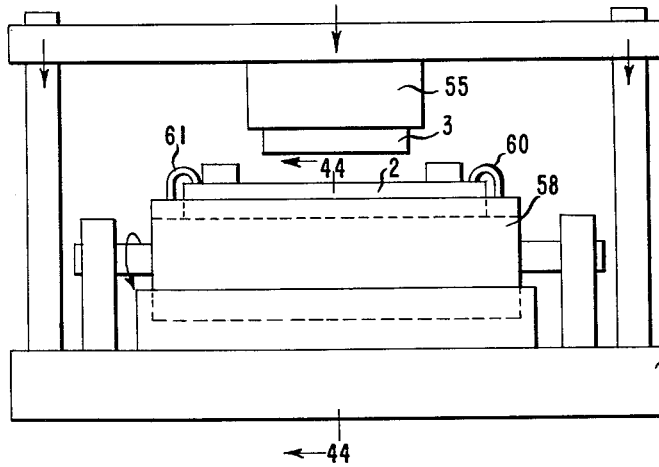
FIG. 43
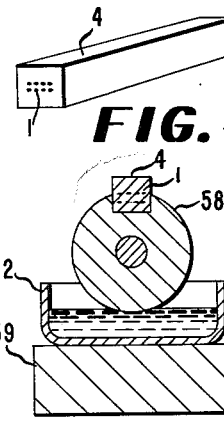
FIG. 45
FIG. 44
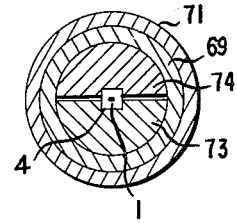
FIG. 47
FIG. 46
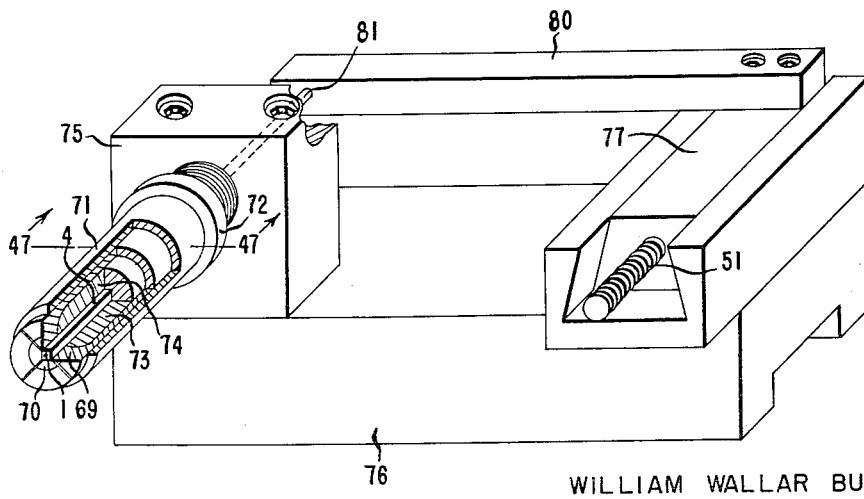
INVENTORS
WILLIAM WALLAR BUNTING, JR.
THOMAS LARSON NELSON
BY
ATTORNEY

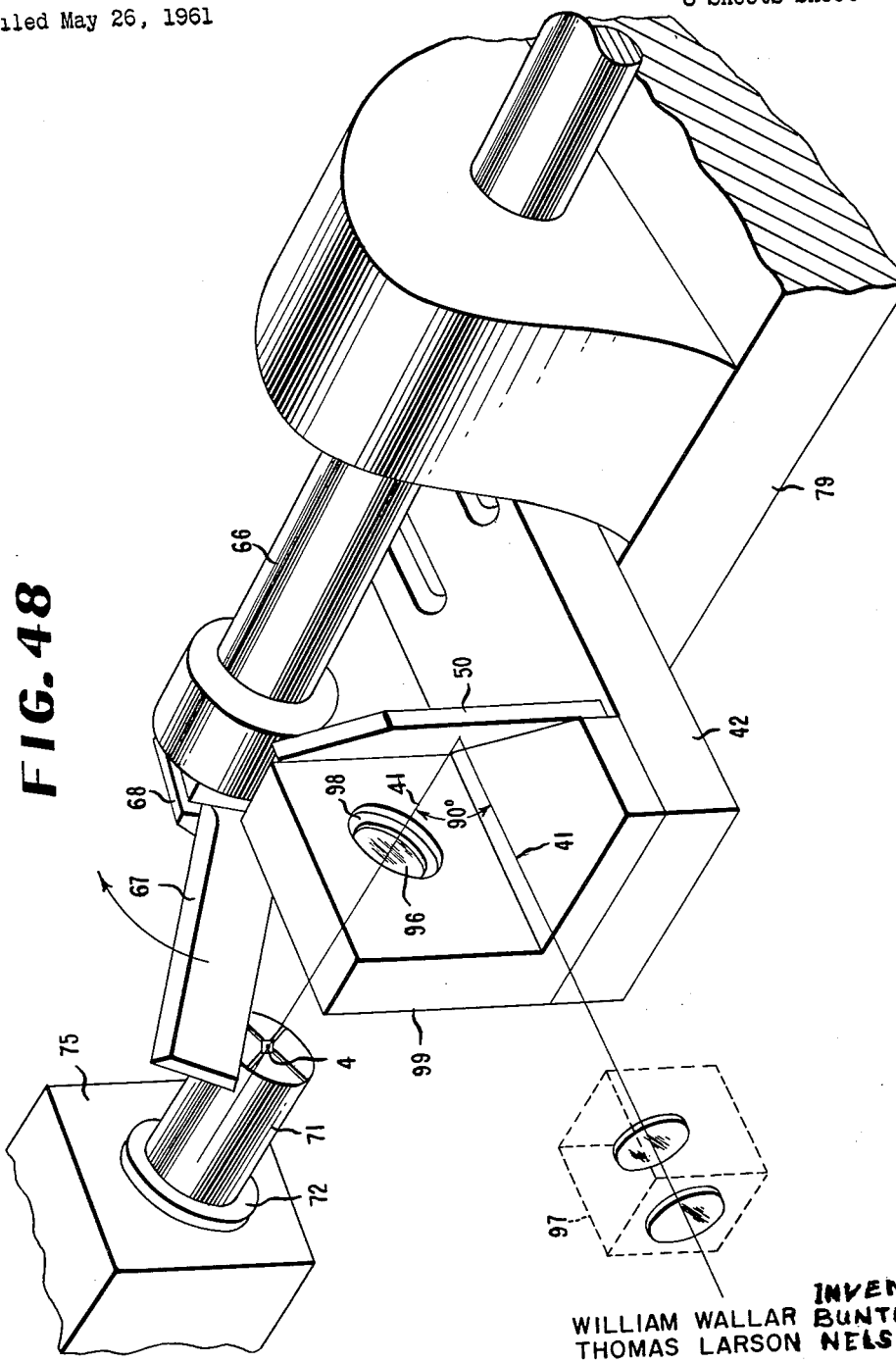

INVENTORS
WILLIAM WALLAR BUNTING, JR.
THOMAS LARSON NELSON
BY
ATTORNEY

United States Patent Office 3,110,151
Patented Nov. 12, 1963

3,110,151
PROCESS FOR PRODUCING COMPACT
INTERLACED YARN
William Wallar Bunting, Jr., Wilmington, and Thomas
Larson Nelson, Newark, Del., assignors to E. I.
du Pont de Nemours and Company, Wilmington, Del.,
a corporation of Delaware
Filed May 26, 1961, Ser. No. 112,927
9 Claims. (Cl. 57—157)

This invention relates to the production of coherent compact multifilament yarn which, even at substantially zero bundle twist and without reliance upon adhesive such as size or fusion of filaments, can be handled and processed in textile operations with the ease of conventional twisted yarn, hence relates to textile yarns (including "industrial" yarns) useful in applications in which the handling and running characteristics of a conventional zero-twist yarn are not satisfactory. The invention relates more particularly to such yarns and their manufacture wherein individual filaments and groups of filaments are randomly intermingled with adjacent filaments and groups of filaments along the length of the yarn to form a coherent unitary strand. This novel multifilament structure is referred to hereinafter as interlaced yarn. Also, for the purposes of the present invention, a compact yarn is defined as a single or plied yarn which is essentially free from ring-like or other filament loops and wherein filament-to-filament spacing generally does not exceed one filament diameter, thereby distinguishing from bulked or textured yarn. The term "yarn" as used herein does not comprehend tows, which are large bundles of filaments brought together for processing treatment and subsequently drafted or spun into yarn for use in textile operations. Since a tow normally has a denier of at least 50,000 which is much greater than the ultimate yarn, any twist or interlace which would interfere with opening the tow is undesirable.

There is a long-standing desire in the textile industry for a process that will produce a coherent yarn bundle at high rates of speed without twisting or sizing yarns to insure adequate handling characteristics. As-spun or zero twist yarns perform poorly in many of the common textile operations, such as winding, weaving, knitting, and the like, due primarily to a looseness of structure that permits individual filaments to snag and break, thence forming fluff-balls, slubs, ringers, wraps, stripbacks, or similar defects. Moreover, zero-twist yarn runs in the form of a ribbon over guides, rollers, etc., and the attendant increase in friction often results in abraded yarn which is even more prone to mechanical failure. As a result of these shortcomings, the textile trade is extremely reluctant to use zero-twist yarn, and yarn producers or those processing the yarn must carry out the additional step of twisting each yarn to provide an acceptable starting product. Twisting, of course, serves to compact and unify a yarn bundle, resulting in a more cohesive structure which resists the pulling out of individual filaments. However, conventional true twisting is expensive and time consuming and, being a discontinuous operation, adds disproportionately to the cost of the yarn. Also, the mechanics of true twisting and the additional handling required often results in yarn of lower quality.

Accordingly, this invention has the following objects (other objects of the invention will also become apparent from the subsequent disclosure and claims):

(1) To provide an interlaced yarn which, even at zero bundle twist and without size or other adhesive treatment, has handling and running characteristics comparable to conventional twisted yarn.

(2) To provide a compact interlaced yarn.

(3) To provide a stable interlaced yarn which can be drawn without substantial loss of coherency.

(4) To provide an interlaced yarn in which the filaments are protected from break-out and strip-back without recourse to true twist, alternate twist, or size.

(5) To provide a plied interlaced yarn.

(6) To provide a yarn which is both interlaced and twisted.

(7) To provide an interlaced yarn having periodic or random lengthwise variations in the density of interlacing.

(8) To provide a rapid continuous process for producing such interlaced yarns from non-twisted or twisted yarn.

(9) To provide such a process whereby the filaments of freshly formed yarn are interlaced to form a compact coherent multifilament strand prior to initial packaging.

(10) To provide such a process whereby the filaments of freshly drawn yarn are interlaced to form a compact coherent strand prior to packaging.

(11) To provide such a process whereby the filaments of a plurality of yarns are interlaced to form interlaced nonwoven fabrics, sheets and webs.

(12) To provide such a process whereby a plurality of yarn bundles of the same or different filament compositions, cross-sections and deniers are simultaneously plied and the filaments interlaced to form a compact unitary strand.

(13) To provide an apparatus suitable for continuous high speed interlacing.

In accordance with this invention, compact interlaced yarn is produced by passing a multifilament strand or plurality of strands, under a controlled positive tension sufficient to prevent formation of ring-like loops, through a fluid jet which separates filaments and groups of filaments from each other and then randomly intermingles them in one or more of the following ways along the length of the yarn to maintain the unity of the product by frictional constraint between the filaments:

(1) Separated filaments or groups of filaments are caused to oscillate between fluid vortices at successive portions along the yarn to intermingle the filaments.

(2) Fluid velocity gradients of sufficient force to separate and move filaments away from the center line of the main yarn bundle are applied across the yarn, and tension is applied to the yarn passing through the jet to return the filaments toward the center line so that the filaments oscillate randomly in the velocity gradients and are intermingled.

(3) Separated filaments or groups of filaments are caused to revolve about an intermediate axis or axes at different speeds or in different directions so that interlacing occurs.

(4) Separated filaments or groups of filaments are rotated randomly and alternately along their lengths in velocity gradients or by rolling on a solid surface or surfaces and the filaments are then brought together to be intermingled by unwinding of different filament twists in frictional contact.

(5) The running threadline periodically or continuously moves transversely through the fluid so that separated filaments or groups of filaments pass randomly into or through one or more high velocity streams at a frequency in excess of 25 cycles per second to cause intermingling reciprocation of the filaments. Means for producing the relative movement may be mechanical or fluid, and may be provided by the action of the stream or streams.

(6) The running threadline is guided between one or more pairs of high velocity fluid streams arranged to converge toward the threadline in a single plane and then impinge on a solid surface which parallels the threadline at that position, so that filaments and groups of filaments are separated and revolved randomly in different directions with resultant interlacing as they are reassembled. The variables of this arrangement are readily adjusted so that the fluid streams will maintain the threadline in position and will eliminate any whole bundle twisting which might reduce the effectiveness of the interlacing action.

The tension on the filaments during treatment is preferably controlled to produce an interlaced yarn which can be handled and processed with ease comparable to that of ordinary true twisted yarn having the same number and geometry of identical filaments. This tension varies with jet design, velocity, etc., but is readily determined under any particular operating conditions. In general, a tension in the range of 0.01 to 1.0 gram per denier is suitable.

The compact interlaced yarn of this invention maintains its unity because of frictional constraint between adjacent filaments, even when there is no bundle twist present, i.e., non-twisted interlaced yarn or yarn which has been untwisted to remove any bundle twist. The term "bundle twist" is used in reference to conventional true twist or alternating twist to distinguish from the interfilament twist introduced by interlacing. Interlaced yarn equivalent in aesthetics and handling properties to highly twisted yarn (17 to 18 turns per inch) can be achieved without bundle twist. In heavily interlaced yarn the filament intermingling is readily discernable, as illustrated in FIGURE 25. However, a relatively light interlacing of zero twist yarn has been found to provide cohesiveness equivalent to that of conventional producer's twist in processing operations. Such a yarn will have the appearance of untreated zero twist yarn to the unaided eye, since most of the filament interlacing is concealed within the yarn bundle. By impressing a static charge on a length of interlaced yarn, the filaments can be caused to separate so that some of the filament entanglement becomes visible. Such a view is shown in FIGURE 26.

The outstanding utility of interlaced yarn can be demonstrated in commercial textile operations, but the nature of the yarn is so different from previously known yarns that it has been necessary to devise unique laboratory methods of evaluating the basic characteristics of useful interlaced yarn. The only effective way which has been found for studying the internal structure of the yarn involves encapsulating the yarn in plastic and cutting transverse slices therefrom. A few of such cross-sections would serve to show that the yarn is compact, but that is also true of conventional twisted yarn. By successively photographing a multitude of closely spaced cross-sections along a yarn on motion picture film and then projecting the film, the filament migrations within the yarn can be observed. From a large number of such three-dimensional studies a system of classifying and counting the extent of significant filament intermingling has been evolved which is referred to hereinafter in the disclosure and claims as "the successive cross-sections yarn evaluation method." A detailed description of this test method will be found near the end of the specification, where the extent of intermingling is defined in terms of "events" per inch. Representative values are given in Table X for lightly interlaced yarns of this invention. It was found that the minimum values so determined for the frequency of filament intermingling events in such yarn correspond approximately to the empirical formula, $$E = 3.77N - 35\left(1 - \frac{25}{25 + N^2}\right)$$

where E is the number of events per inch and N is the number of filaments in the yarn bundle. Preferably the number of events per inch corresponds to at least about $$E = 4.23N - 30\left(1 - \frac{14}{14 + N^2}\right)$$

The frequency may be more than 10 times as great for heavily interlaced yarn. By the same test, an untreated zero twist yarn would theoretically have a value of zero, but normal handling will usually cause a small number of filament migrations to occur.

The above method is effective for defining the structure of an interlaced yarn but it is tedious and expensive. Furthermore, much more experience with this new yarn will be required before the structure can be accurately correlated with processing and end use properties in the manner that twist in turns per inch is used as a criterion for conventional yarn. A simple direct test of bundle coherency in interlaced yarn has been devised which will be designated "the hook-drop test" in the subsequent disclosure and claims. It is sufficiently rapid for control purposes. A sample of yarn is clamped in a vertical position under the tension provided by a weight in grams which is 0.20 times the yarn denier (but not greater than 100 grams). A weighted hook, having a total weight in grams numerically equal to the mean denier per filament of the yarn (but weighing not more than 10 grams), is inserted through the yarn bundle and lowered at a rate of 1 to 2 cm./second until the weight of the hook is supported by the yarn. The distance which the hook has travelled through the yarn characterizes the extent of filament entanglement. The result is expressed as a "coherency factor" which is defined as 100 divided by the above distance in centimeters. Since filament intermingling is random in interlaced yarn a large number of samples should be tested to define a representative value for the whole yarn.

Further details of the hook-drop test are given in the examples, following Table II. For the compact interlaced yarns of this invention, the coherency factor, as defined, is at least 2.5 for lightly interlaced yarn and may exceed 1000 for the most heavily interlaced yarns. The yarns of more particular interest are those interlaced to have coherency factors within the range from 5 to 500. The highly coherent interlaced yarns are noteworthy for their end-use properties. Interlaced yarns in the range of 5 to 100 have excellent handling and running characteristics in comparison with the conventional twisted yarns in textile processing operations. The coherency factor is from 0 to about 1 for the previously known untreated zero twist yarns when tested as defined. Twisting increases the coherency factor, of course. Even if such twist is backed out to zero twist, this twisting and untwisting will leave a residual coherency, but the coherency test clearly distinguishes the compact interlaced yarn of this invention from previously known unbulked zero twist yarn which is free from size or other means for sticking the filaments together.

In its simplest embodiment, the apparatus of this invention comprises a fluid interlacer in combination with means for passing the yarn at controlled positive tension and with no net mechanical overfeed through the interlacing fluid. The expression "net mechanical overfeed" is used to designate overfeed to compensate for the mechanical shrinkage of the threadline which comes about through the intermingling of filaments. Obviously, if it is desired to simultaneously mechanically work and/or heat the yarn while interlacing to achieve relaxation, higher overfeed rates can be used without materially changing the bulk of the yarn. The fluid interlacer comprises a yarn passageway in combination with one or more fluid conduits positioned to direct a stream of high velocity fluid toward the yarn axis. The stream of fluid may be directed perpendicular to the yarn axis at the point of contact or it may be angled forward or backward along the yarn axis. The yarn passageway may be rectangular or circular in cross section, or it may be an open trough or slit with an axis parallel to the yarn path, or it may have any suitable cross section intermediate these configurations. The yarn passageway cross section need not be the same in form throughout.

The fluid conduits, where there are a plurality, may be disposed at intervals along the yarn passageways, may be alternately disposed at intervals along opposite sides of the yarn passageway, or may be disposed in opposed pairs along the length of the yarn passageway. Alternatively, the fluid may be supplied in a transversely uninterrupted stream having a width as great as the length of the yarn passageway. When the fluid conduits are in opposed relationship, such conduits may have a common length axis or they may be inclined with respect to the yarn axis so that both opposed conduits impose a forwarding or braking action on the threadline. The fluid conduits may be circular in cross section or of any other suitable configuration, such as rectangular, oval or the like. Any fluid substantially inert to the yarn may be employed in the process of this invention, and air is preferred.

At high velocities, less dense fluids may serve as the interlacing agent. For compressible fluids, a fluid velocity of one-half sonic velocity is generally satisfactory for satisfactory interlacing, i.e., so that the necessary controlled fluid turbulence is achieved. It will be understood that non-compressible fluids can be used at supply pressures which provide severe velocity gradients.

In the drawings, which illustrate the invention and apparatus discussed hereinafter, FIGURES 1, 4, 6, 8, 13 and 15 represent longitudinal views of fluid jets useful for interlacing in accordance with this invention, the cross-sections being taken along the axis of the yarn passageway except in FIG. 13, when the central axis is used, FIGURES 2, 3, 5, 7, 9, 11 and 16 represent corresponding end views of the above fluid jets, the cross-sections being taken along the indicated lines of the preceding longitudinal view, FIGURE 10 is a perspective view of the rotary fluid-interlacer shown in FIGURES 11 and 13, and FIGURE 12 is an enlarged cross-sectional detail thereof, FIGURE 17, on an enlarged cross-sectional view of part of the thin slot jet illustrated in FIGURES 15 and 16, shows the direction and velocity gradient of fluid flow in this type of jet, FIGURES 14 and 18–20 are similar illustrations of the direction of fluid flow in other jet constructions, and FIGURES 21, 22 and 23 illustrate corresponding types of velocity gradients, FIGURE 24 illustrates an additional fluid effect, FIGURE 25 illustrates an interlaced yarn, FIGURE 26 is a corresponding view after the yarn filaments have been opened to show entanglement, FIGURES 27 to 29 illustrate the effect of fluid velocity gradients on filaments within an interlacing jet, FIGURE 30 is a longitudinal view of an interlacing jet having string-up slot and FIGURES 31 and 32 are cross-sectional views taken on the indicated lines of FIGURE 30.

FIGURES 33 through 38 illustrate additional forms of interlacing jets,

FIGURE 39 is a diagrammatic illustration of the process of successively drawing and interlacing yarn, FIGURE 40 is a diagrammatic representation of interlacing yarn fed directly from a spinneret as it is formed, and FIGURES 41–62 illustrate the laboratory procedure and equipment used to analyze the structure of interlaced yarn, wherein FIGURE 41 is a general plan view of the analyzer for photographing successive cros-sections, FIGURES 42–44 illustrate equipment and steps involved in preparing specimens, FIGURE 45 shows a specimen of yarn encapsulated in plastic, FIGURES 46–48 show details of the means provided for mounting, slicing and viewing specimens in the apparatus of FIGURE 41, and FIGURES 49–62 illustrate schematically the method of analyzing the photographic results.

In the various figures illustrating fluid interlacers, like numbers represent similar structures, even though the shape or form of that structure may vary from one figure to the next. For example, the yarn passageway is numbered 12, regardless of whether the yarn passageway is cylindrical in form, a slot, or a slot with a rounded floor, etc. The planes upon which sectional views are taken are indicated on FIGURES 1, 4, 8, 11, 15, 30, 35, 43 and 46 by broken lines, the ends of which are designated by numerals corresponding to the number of the sectional view in which the cross-section is shown and have arrows applied to indicate the direction in which the view is taken.

FIGURE 1 illustrates a representative fluid interlacer 11 useful in this invention, containing length-wise-yarn passageway 12 which, in this embodiment, is substantially cylindrical in form throughout its length. In interlacer 11, fluid conduit 13 intercepts yarn passageway 12 at 14 at right angles to the wall thereby and positioned so that the longitudinal axis of fluid conduit 13 and yarn passageway 12 intersect perpendicularly. These relationships are seen in FIGURE 2. FIGURE 3 is a section of an interlacer similar to that of FIGURE 1 showing two opposed fluid conduits 13 and 13a having a common longitudinal axis. FIGURES 4 and 5 show an interlacer with a rectangular yarn passageway 12 (best seen in FIGURE 5). It is obvious that multiple jets may be arranged side-by-side to handle individual ends of a warp sheet of yarn. Air or other fluid can be supplied via a suitable manifold arrangement.

FIGURES 6 and 7 show views of the interlacer of FIGURES 1–2 modified to include circumferential restriction 19. Restriction 19 or its substantial equivalent serves to direct exhausting fluid preferentially toward the yarn inlet or exit, depending on its direction of travel. In the case of countercurrent fluid flow, such directed exhausting permits enhanced opening of the yarn bundle prior to its encountering the zone of controlled fluid turbulence; conversely, cocurrent flow facilitates maintenance of controlled positive tension on the yarn during its passing the turbulent zone. FIGURES 8 and 9 show an interlacer with two sets of opposed fluid conduits 13 and 13′ spaced longitudinally along the yarn passageway. An interlacer which facilitates bundle opening is shown in FIGURES 10, 11, 12 and 13. FIGURE 11 shows an end-on view of "wheel" interlacer 11 containing rectangular yarn passageway 12 which is a circumferential slot in the outer periphery of the interlacer, and which is interrupted by eight fluid outlets 14, 14a, etc., disposed radially about the wheel, alternately on opposite sides of the passageway 12. These details are seen in FIGURE 13. Each of the fluid conduits 13, 13a, etc., feeding outlets 14 communicate with common supply duct 17, which is within hollow shaft 3, supported by bearings 24 in housing 25. Housing 25 is interrupted at threaded opening 26 to admit fluid. The apparatus is thereby rotatable but is fed a continuous supply of fluid at all times.

FIGURE 10 is a pictorial view of "wheel" interlacer 11 as it is positioned for operation. FIGURE 12 shows an enlarged cross section of the yarn passageway and a fluid conduit. In operation, yarn 27 encounters interlacer 11 as shown, making a partial wrap thereabout. The angle of wrap, A, is preferably between about 60 degrees and about 150 degrees. Interlacer 11 is rotated through shaft 3 at a predetermined peripheral speed which is a function of the yarn speed. Thus, its action on the yarn approximates that of static multiple fluid conduits but, by virtue of the adjustable relativity of wheel and yarn speeds, the interlacing density can be made variable along the length of the yarn, or, in the case of comparable wheel and yarn speeds, can be made exceedingly dense. The use of "wheel" interlacer 11 permits production of fairly dense interlaced product at high yarn speeds. By increasing the number of fluid outlets, a further increase in interlace density is made possible. Numerous products having random variation of interlace density are prepared at each yarn-to-wheel speed ratio.

In operation, the interlacer 11 is positioned intermediate suitable yarn forwarding means, i.e., means capable of advancing the yarn through the interlacer at controlled positive tension. Preferably, interlacing is carried out as an adjunct to one or more of the common textile operations, such as spinning and/or drawing, packaging, etc., thereby taking advantage of existing suitable yarn-forwarding means. In a typical operation, the interlacer is continuously supplied with air under pressure which is directed into yarn passageway 12 through fluid conduits 13. The air on entering the yarn passageway forms velocity gradients wherein the gradients are most abrupt in a plane perpendicular to the axis of the running yarn. The controlled fluid turbulence which derives from these procedures causes the yarn bundle to be opened (the filaments separated), the extent depending on the yarn tension and the fluid velocity or pressure, and, simultaneously, or subsequently, causes the individual filaments to be twisted and intermingled in a purely random manner to produce a compact interlaced yarn with a very stable consolidated structure which permits the yarn to be handled as a unitary strand in the same manner as a true twist yarn.

FIGURE 15 shows another embodiment of fluid interlacer which is of the slot type. FIGURE 16 is a cross-sectional view taken along line 16—16 of FIGURE 15, and FIGURE 17 shows the fluid velocity profile in the fluid stream of the device shown in FIGURES 15 and 16.

Referring to FIGURES 14, 18, 19 and 20, formation of multiple fluid vortices in the various yarn passageways is shown by the arrows originating at 10. FIGURE 18 shows the two vortices which are formed in rectangular yarn passageway 12; FIGURE 19 shows the two vortices which are present in a cylindrical yarn passageway. In FIGURE 20, four vortices are seen to exist in a cylindrical yarn passageway intercepted by opposed fluid conduits; a similar effect also takes place in a rectangular passageway or a rectangular one having a rounded floor. In this latter case, the four vortices are symmetrical as shown when the fluid emerging from the two fluid conduits is maintained at about the same pressure. The effect of the quadruple vortices can be reinforced by use of a second pair of opposed fluid conduits displaced along the yarn axis. One arrangement of oppositely directed conduits is shown in FIGURES 30–32. A rectangular or slot-shaped yarn passageway 12 is intercepted by six fluid conduits 13, 13a, etc., positioned alternately on opposite sides along the length of the yarn slot, as shown in longitudinal view 30. The construction at one of these positions, corresponding to a cross-section taken on line 32—32, is shown in FIGURE 32 with the interlacer fully assembled for operation. The fluid passes through conduit 13 and exhausts into yarn slot 12 through a feeding outlet 14 drilled perpendicular to the slot. Guide pins 15 and 15a are provided to keep the yarn centered over outlet 14. These pins are held in place by retaining means 16 and can be withdrawn during string-up, which is then readily accomplished because the yarn slot is open at the top. In the construction shown, outlet 14 is drilled from outside the slot and the opening away from the slot is sealed by retaining means 16. Opposed pairs of conduits can be arranged in a similar manner.

The arrangement shown in FIGURE 14 is highly effective. It is preferred that a snubbing guide be positioned immediately upstream from an interlacer of the type shown in FIGURE 19 in order to curb whole bundle twist buildup, but such means ordinarily are not needed when using an interlacer having opposed fluid conduits as shown in FIGURE 14 or 20.

It is possible to form multiple fluid vortices by taking advantage of the so-called Von Karman effect. Referring to FIGURE 24, a stream of fluid directed lengthwise through yarn passageway 12 from fluid conduit 13 encounters fixed cylindrical pin 23 and, downstream from the pin, multiple vortices are formed.

The rotary or other motion of the fluid in the passages of FIGURES 18, 19 and 20 may be examined in terms of velocity gradients as depicted in FIGURES 21, 22 and 23, respectively. The planes or lines X—X are zero lines from which are plotted vectors V, V', V", etc., which represent the velocity of the fluid stream at any given point; the curves 100, plotted at the extremities of the vectors, show typical velocity gradients in the moving fluid. It will be seen that the gradient is quite steep in some regions, such as those near the edges of a moving fluid shown by points 101 to 102; in this case the velocity drops from some finite value to zero. Where two adjacent fluid streams move in opposite directions, gradients may be even more steep and velocity reversals will occur as shown by points 103 to 104 (zero velocity) to 105. In other regions, such as the center of a given stream, the velocity gradient is relatively flat (i.e., near constant velocity) such as in the region from points 106 to 107. In the case of a narrow slot jet of the type shown in FIGURES 15 and 16, where fluid in an uninterrupted stream is admitted along one entire edge of the slot, the fluid velocity is generally unidirectional; however, FIGURE 17 shows the steep velocity gradients that exist.

The behavior of the individual filaments of a yarn bundle in the fluid stream can be considerably different, since the action of the fluid is dependent upon the location of a filament in the fluid stream as illustrated schematically in FIGURES 27–29 by plotting vectors V to $V_3$ on curves 100' and 111. Obviously, a greater torque is exerted on the filament 109, which is nearer the flow boundary, than on the intermediate filament 108, because of the greater velocity differential across the filament. FIGURE 28 indicates this by velocity vectors. The torque on filament 109 may be further augmented by rolling contact with a solid boundary, i.e., the jet wall. Contrarywise, a filament 110 which is located generally in the center of a given stream, will not be subjected to torque because it is acted upon by portions of the fluid stream having substantially equal velocities on each side of the filament, but will be moved from place to place.

Referring to FIGURES 14 and 18, separate filaments 9, 9a, 9b, etc., of the opened yarn bundle are shown as they are disposed within the zone of controlled fluid turbulence of the interlacer. Filament 9a is subjected to the clockwise rotation of the one vortex while filament 9b is being revolved in the opposite direction by the counterclockwise rotation of the other vortex. At the same time, many of the filaments in the bundle will be twisted in one direction or the other by the torques discussed above. In addition to revolving and twisting, the filaments also move at varying velocities relative to each other and are thrown in amongst one another in what amounts to an intermingling process. In FIGURE 18, for example, filament 9c is about to be abruptly forced between filaments moving at different velocities. If it contacts a filament which has received a different twist, intertwisting of the filaments may also occur as the twist unwinds. The summation of the various actions and interactions believed to exist at the filament level results in the formation of the interlaced yarn structure, shown under normal conditions in FIGURE 25, and opened up under a static charge of 25,000 volts in FIGURE 26 in order to illustrate the nature of the filament intermingling.

The following terms will be applied to the different modes of filament behavior which occur when the filaments are exposed to the fluid streams:

(1) Splaying; i.e., movement of filaments away from other filaments or generally away from the bundle axis.

(2) Filament rotation; i.e., rotation of a given filament about its own axis (filament twisting).

(3) Filament revolution; i.e., movement of the filament about some other axis such as another filament or group of filaments, with or without rotation of the given filament about its own axis.

(4) Bundle rotation; i.e., twisting of the yarn about its axis.

(5) Migration; i.e., movement of the filament from place to place without regard to direction (not limited to splaying); in the course of migrating, a given filament may or may not interlace or co-act with other filaments.

(6) Similarly, the entire bundle of filaments or some fraction of the bundle of filaments, called a group of filaments, may rotate, revolve or migrate; when the behavior of a filament bundle or group is discussed it will be understood that a substantial fraction of the filaments (if not all of the filaments) comprising that bundle or that group behave in like fashion.

(7) Cranking; i.e., revolution of a filament bundle or group about an axis other than its own axis.

(8) May-poling; i.e., interlacing of filaments when revolved at different speeds about a common axis passing through a yarn section, an action analogous to the Mayday dance in which ribbons attached to a pole are twisted randomly about it.

Splaying can be accomplished by centrifugal action induced by high speed rotation of an entire bundle or a subgroup arising from rotary action of the fluid stream; however, in a situation where the fluid stream itself is not rotating, rotation of the bundle or sub-groups of the bundle may still occur by virtue of the existence of steep velocity gradients. The splaying which occurs permits other bundle actions and filament actions to occur; it should be noted that these actions can occur concurrently with the splaying or can occur subsequent to the splaying.

There are two distinguishable forms of the general interlaced product. In the periodically interlaced type, the entire bundle is interlaced at particular cross-sections of the threadline, but the interlaced sections are separated by non-interlaced sections to provide a periodic variation in structure which may be either random or substantially regular along the threadline. This is easily observable through a microscope, but is not readily apparent to the unaided eye. In the other type, at any one cross-section, a number of filaments of the total is interlaced and the remaining filaments at that cross-section are not; proceeding along the threadline, other groups of filaments are seen to be interlaced where those that were interlaced in the preceeding cross-section are not. On the filament level, the non-uniformaties in this latter product can be observed with a microscope; but to the unaided eye the product is uniform.

Interlacing of the above types can occur in various ways of which the most useful process for producing the periodically interlaced product is believed to be one which involves the action defined above as May-poling. The threadline is fed through a jet so that it remains in a powerful vortex flow for sufficient time to rotate the filament bundle at high velocity, causing the filaments to fly apart from each other. The filaments revolve at different speeds about the bundle axis because of different fluid velocities at different locations in the vortex. This latter action results in interlacing of filaments and group of filaments. By continuing this action to the point where the filaments upstream from the jet become interlaced to such an extent that they are no longer capable of separating as they enter into the flow, then this interlaced section will proceed as a coherent bundle through the vortex flow. While this structure is being produced upstream from the flow, a mirror image is also produced downstream. Both of these interlaced sections then proceed from the jet toward the package. The interlaced sections are produced much more readily when at least two different groups of filaments of the bundle are passed through different fluid vortices which rotate in opposite directions as illustrated in FIGURES 14 and 18.

The period of the variation in interlacking intensity along the yarn may be as short as ⅛ inch or less, but can also be several feet in length. Preferred conditions will provide a periodicity ranging from about ½ to 6 inches. Under otherwise comparable conditions the periodicity will be shortened by increasing the temperature of the fluid vortex or the yarn, by increasing the amount of finish on the filaments treated provided that there is not such an excess as to prevent filament separation, or even by merely wetting the filaments. An extremely tight interlacing can be provided by the use of heated fluid in the jet, as illustrated in runs 70–75 (Table IX). The temperature need not be high enough to provide any physical change discernable in the filaments after treatment, e.g., this treatment can be accomplished without crimping or changes in crystallinity.

The product having a substantially continuous interlace is produced by controlling the interlacing of the separated groups of filaments so that the May-poling action does not proceed to the point where periodicity occurs. This is accomplished by insuring that the yarn is traversed through the flow so that any one group of filaments does not remain too long in one vortex. As an example, if the yarn is traversed at high speed through a high velocity jet stream, the individual filaments and groups of filaments that first come in contact with the flow will be violently separated from the main bundle. As additional filaments and groups of filaments enter this jet stream they will also be separated from the main bundle. The filaments that first separate from the bundle are traversed through the jet stream to other regions of the flow before the last filaments of the bundle enter the flow. It is seen that, in traversing through a jet stream, some of the filaments will be on one side of the stream where the velocity gradient will cause rotation in one direction, while other filaments on the other side of the jet stream will be rotated in the opposite direction. A similar result is achieved when the jet is used to cause some of the filaments and groups of filaments to roll along a solid boundary while others traverse the jet without being rotated in this way. The filaments may also migrate between groups so that the individual filaments in a group in one part of the vortex may be part of two or more groups in another part of the vortex further downstream.

The motion of the filaments through the stream for the above purpose can be induced by several means. The bundle can be traversed by many well-known mechanical means so that the filaments and groups of filaments will successively pass through the flow or so that they will successively roll on the boundary surface. Alternatively, the yarn bundle can be made to rotate or oscillate by pneumatic means. One example of this would be providing a yarn tension and guiding arrangement that endeavors to maintain the threadline in the middle of a high velocity flow while the high velocity flow endeavors to keep the yarn out of that region; a self-induced oscillation will result.

In general; any of the interlacing mechanisms discussed may take place, at least to some extent, when using any of the jets disclosed under suitable conditions. The effect of process conditions will be discussed subsequently. Even under a particular set of operating conditions, consideration of the interlacing action is complicated by more than one form of filament intermingling occurring at the same time in different parts of the filament bundle; in addition, the same filaments may be subjected to first one and then another action in random fashion along their lengths. This will be simplified by focussing attention on the interlacing mechanism believed to predominate in a particular method. Under the conditions of the specific examples described in the specification, the periodic interlacing mechanism may be understood to predominate in those runs which illustrate the use of air at pressures higher than about 20 pounds per square inch with yarn tensions of 0.25 gram per denier or less. Self-induced oscillation was also present in many of the runs but under these conditions was not sufficiently fast nor regular to avoid the formation of whole bundle interlace that result in a periodic product. However, a single vortex jet moves the yarn bundle into and out of the jet stream at sufficient speed and with sufficiently high frequency for the more continuous product to result. In the interlacer of FIGURE 34 and the thin slot jet of FIGURE 16, the rolling of filaments and small groups of filaments adjacent to a boundary surface also contributes to the uniform interlace in the product.

When using the thin-slot type of jet illustrated in FIGURES 15 and 16, wherein unidirectional fluid flow exists and the slot width is of a dimension smaller than that of the average threadline diameter, the entering threadline is separated into a ribbon-like form and filaments and subgroups of filaments are forced to move randomly over the boundaries of the slot. A self-induced vibration of the threadline results when fluid forces attempt to push the filaments or subgroups of filaments out of the slot against tension forces, and tension forces tend to push the filaments into the slot against the fluid forces. Alternating filament rotation is inserted in the filaments and subgroups of filaments randomly due to the rolling action that exists along the boundaries resulting in a uniform interlace. In this type of jet, the fluid preferably operates simultaneously on a length of yarn of from ¼" to 5" or more. The effectiveness of such a jet is enhanced when the yarn is splayed prior to its entrance into the jet.

FIGURE 38 is another illustration of an interlacer in which fluid vortices are formed in the yarn passageway by fluid entering this passageway from opposite sides, that is, through conduits 13, 13a, and 13b.

The process of this invention desirably is carried out in conjunction with one or more of the conventional textile operations, such as spinning, drawing, winding, packaging, or the like, thereby taking full advantage of existing means for forwarding the yarn at controlled positive tension and obviating the need for a separate interlacing step. FIGURE 40 illustrates an assembly of apparatus whereby yarn may be continuously interlaced during the spinning operation; FIGURE 39 shows apparatus useful for interlacing as a part of the drawing operation. In both figures, interlacing takes place prior to yarn packaging; therefore, the package to be prepared may be utilized without having to divert it through separate twisting. Referring to FIGURE 40, the filaments 28 issuing from spinneret 29 converge at guide 30 into yarn 27, to which finish is applied (means not shown) prior to passing the nip rolls 31, which serve as forwarding means to the interlacer 11. Interlacing may also precede application of finish, if desired, or finishing may be omitted altogether. The interlacer can be used in place of guide 30 to accomplish convergence. After interlacing with any one or more of the above-described apparatus, yarn 27 passes feed roll 32 and then to the takeup point, backwindable package 33 driven by drive roll 34. FIGURE 39 illustrates the string-up assembly whereby interlacing occurs immediately after drawing and prior to packaging. In accordance with this embodiment, undrawn yarn 27 is withdrawn from package 35, passes through pigtail guide 30, then is passed in multiple wraps about driven feed roll 36 and its associated separator roll 37. In a highly preferred embodiment, yarn is supplied directly to guide 30 from a spinning position (see FIGURE 40) rather than a package. From feed roll 36 the undrawn yarn makes one or more wraps about a snubbing pin 38 and is drawn in frictional contact therewith under the urging of draw roll 39 and its associated separator roll 40. Draw roll 39, of course, has a higher peripheral speed than feed roll 36, whence the yarn is elongated to several times its original length. From draw roll 39, which serves as the feed point, the yarn passes to interlacer 11 as described hereinabove, then passes idler roll 32 to the package 33 driven by drive roll 34. Conventional reciprocating traversing means (not shown) are usually associated with both the FIGURE 39 and FIGURE 40 windup assemblies. The interlacing operation also may be effected during repackaging operations, such as during beaming. In fact, the nature of the interlacing process permits its practice at practically any stage of textile handling.

In any continuous operation, it is of considerable advantage to utilize an interlacer of the self-stringing variety. The slotted interlacers of FIGURES 4-5 are, of course, self-stringing. A particularly desirable self-stringing interlacer is shown in FIGURES 36 and 37, where interlacer 11 has a cylindrical yarn passageway 12. Yarn passageway 12 is intersected by two pairs of fluid conduits 13a—13b and 13c—13d, each pair having a common longitudinal axis, the two axes being disposed at right angles, one to the other. The fluid conduit pairs 13a—13b and 13c—13d are spaced laterally as shown; both form the similar quadruple vortices (see FIGURE 20), hence their separate effects tend to reinforce one another. The string-up slot 41 extends the length of the interlacer and permits facile string-up with minimum loss of controlled fluid turbulence. The action of the fluid serves to "curtain" the string-up slot so that there is little likelihood of the yarn blowing out of yarn passageway 12 through slot 41. Other embodiments of self-stringing interlacers also can be designed to suit particular circumstances.

The yarn-forwarding means associated with the fluid interlacer of this invention should be capable of advancing the yarn at controlled speed and tension and zero net overfeed, in order that the interlaced product exhibit good uniformity. Ordinarily, adequate control is provided by cooperating rolls located up and downstream from the interlacer, such as draw roll 39 and take-up roll 34 in FIGURE 39, or nip rolls 31, and take-up roll 34 in FIGURE 40. By adjusting the relative peripheral speeds of these rolls, controlled and uniform yarn speed and tension can be achieved. For the most uniform operations, net overfeed to the interlacer must be sufficiently low to prevent the formation of substantial numbers of filament loops, and slippage of the yarn on the advancing means is to be avoided. Such slippage is avoidable by well-known prior art procedures, involving the use of cooperating separator rolls (roll 40 in FIGURE 39), nip rolls, multiple yarn warps, and the like. Optionally, control of yarn speed and tension may be effected by use of upstream tensioning means, such as a tension gate, and downstream advancing means, such as driven rolls, etc. In some cases, it is advantageous to utilize guide means, such as eyelets, immediately up and downstream from the interlacer. Alternatively, the guide means may be within the interlacing device (see FIG- URES 30, 31, 32); in some cases having yarn guides within the interlacing device approximately 1/8" up and/or downstream from the air passage has been shown to improve the product in terms of uniformity. These guides serve generally to stabilize the yarn line, to provide accurate alignment in the interlacer, and to minimize fluctuations in the yarn line caused by exhausting fluid or downstream reciprocation at the windup. The latter effects are further dampened by the use of an auxiliary guide and/or feed means, such as idler roll 32 shown in both FIGURES 39 and 40. Other auxiliary apparatus refinements may be employed as required in specific applications, e.g., means to forward and guide two or more ends of yarn to a single interlacer during plying, etc., or intermediate guide means to be used in multiple or serial interlacing.

The optimum design of a specific interlacing jet depends to an appreciable extent on process and product variables such as tension, fluid pressure, overfeed, yarn denier, degree of interlacing desired, yarn speed and the like. Interlacer dimensions should be as small as practicable to conserve interlacing fluid and to concentrate the zone and effect of the controlled fluid turbulence. The yarn passageway of the fluid interlacer should have an internal diameter or width of 2 to 100 times the yarn diameter. For textile deniers, this will usually be between about 0.002 inch and about 0.4 inch, and preferably between about 0.015 inch and 0.075 inch. In the thin slot type of jet the width of the slot may be of the order of 1½ of the unmodified yarn diameter. Yarn passageways, of course, can be intermediate between the cylindrical rectangular and their cross-sectional areas at initial point of contact between the yarn and the fluid stream should preferably correspond to areas of circles having the above diameters.

The length of yarn passageway may be widely varied, and can be less than its width (or diameter). Preferably, the yarn passageway will be about 2 to 10 times its diameter or width and should not normally be more than 20 times its diameter. Longer yarn passageways can be used usually in combination with more than one fluid conduit and frequently it will be desirable to have one or more exhaust ports to release interlacing fluid and minimize back pressures. A series of unitary interlacers will normally be preferred over a single interlacer with multiple fluid conduits and a long passageway. For an interlacer with a single fluid conduit or a pair of opposed fluid conduits the length of the yarn passageway should preferably be from about 0.1 inch to 1.0 inch. The above considerations do not generally apply to the thin slot type of jet; for this jet the slot length in the direction of yarn travel may be as much as 500 times the width of the yarn passage and is preferably in the order of 0.5 to 5 inches long.

The area of the fluid conduit is usually less than the area of the yarn passageway at the point of interception except for the thin slot type jet where the area of the fluid conduit is substantially equal to the cross sectional area of the slot measured in a plane transverse to the slot and parallel to the direction of yarn travel. The same relationship holds in the case of either conduit of an opposed pair, where, in addition, the areas of the conduits are preferably equal to each other at the point of interception with the yarn passageway. The ratio of the area of the yarn passageway to the area of the fluid conduit should be from about 1:1 to about 6:1, although in the case of "slot" jets, e.g., FIGURES 30–32, the area ratio can be much higher.

The yarn passageway in the fluid conduit may be cylindrical in shape, but either or both may be other than circular in cross section, and either may be varied in area and cross-sectional from throughout its length. Another variation is a yarn passageway which is a rectangular slot or a rectangular slot with a rounded floor, intercepted by a circular fluid conduit or plurality of conduits.

The yarn passageway may also be a slit between two opposed planes which may or may not be enclosed along one side of the yarn passageway. The fluid conduit(s) will intercept the yarn passageway along the center line of the yarn travel.

In operation, yarn will pass through a yarn passageway such that its axis generally coincides with that of the passageway if the latter is cylindrical, or is parallel and equidistant from the sides of a slot-like yarn passageway. Individual fluid conduits may be inclined from the perpendicular up to 60° or more. Fluid conduits may be opposed, i.e., of a number of longitudinal axis or they may assert a simultaneous forwarding or braking action on the yarn, or again they may be positioned so that one forwards while the other brakes the running yarn. When several fluid conduits are utilized in a number of yarn passageways, it is preferred that there is a lateral spacing between each conduit which is at least as great as the mean diameter of adjacent fluid conduits, or the substantial equivalent if they are not circular. The prime concern is optimization of the interlacing process.

For a given interlacing jet, the process variables that affect the efficiency of interlacing a particular yarn appear to be yarn tension and speed, temperature and pressure or velocity of the interlacing fluid and overfeed of yarn to the interlacer. For the best interlaced product, there should be essentially no mechanical overfeed of yarn to the interlacer. That is, yarn should be withdrawn from the interlacer at about the same rate as it is supplied thereto. What little overfeed is used when treating with room temperature fluid will be that small amount needed to compensate for the shortening of the threadline through the interlacing of the filaments. Of course, as the high temperature fluid or a plasticizing agent is utilized, the overfeed can be increased beyond these normal limits to allow the individual filaments to shrink.

The above variables determine the character of the interlaced product. They are, generally speaking, variables which may be controlled independently, e.g., an increase in tension may be off-set by a sufficient increase in fluid pressure and vice versa. Similarly, an increase in yarn speed may be counteracted by a decrease in tension, an increase in fluid pressure or both.

Any fluid substantially inert toward the yarn may be used as the interlacing agent, with air at room temperature being highly preferred. The fluid may be either a liquid or gas at the temperature of operation, but inert gaseous materials, such as steam, nitrogen, carbon dioxide, etc., are preferred. The fluid may be heated or refrigerated, as desired. Steam, heated gases, or fluids which are solvents for the yarn may be employed where the extent of their plasticizing action, if any, is not harmful. Mixtures of fluids may also be used if desired. The fluid may contain various additives such as water, finish, yarn lubricants or the like.

In general, the interlacing fluid should reach a velocity of at least ¼ sonic, and preferably about ½ sonic velocity or more, immediately prior to impinging upon the yarn, in order to provide substantial fluid turbulence. At higher velocities, less dense fluids may be employed. Air at pressures from about 1 p.s.i.g. to about 150 p.s.i.g. or higher are suitable, the optimum pressure being determined by the jet design, yarn speed, yarn tension and other conditions discussed below. At high tensions, pressures of 5 to 100 p.s.i.g. or higher may be preferred for the majority of interlacer jets. Lower pressures can be used at lower tensions. The thin slot jet is preferably operated at pressures in the range of 1 to 25 p.s.i.g.

The speed of the yarn during interlacing determines the time interval during which the yarn is subjected to the action of the interlacer, and as a result, controls the extent of interlacing, other factors being equal. However, the yarn speed actually does not limit the process, since an increase in fluid pressure or a decrease in yarn tension or both will compensate for high speeds. In fact, the instant process may be operated at speeds as high as 5000 yards per minute or more with excellent results. As pointed out hereinabove, it is preferred that the yarn speed be controlled, for the sake of product uniformity. It is also possible to prepare a yarn having variable lengthwise interlacing density by systematically varying the yarn speed, fluid pressure or tension while maintaining the other variables at fixed values. Such a yarn may be useful in the preparation of novelty fabrics, etc.

Control of yarn tension is important. If the tension is too high, sufficient bundle opening may be prevented, hence the product may be only moderately interlaced. On the other hand, if the yarn tension is too low, i.e., the yarn overfed to the interlacer, or is allowed to become slack within the zone of controlled fluid turbulence, the product may lack permanency of structure, and may contain so many loops, crimps, and other such conformations that the yarn becomes bulky. Accordingly, the yarn must be maintained under controlled positive tension and without net mechanical overfeed during interlacing. Tension should be controlled to an extent sufficient to assure uniformity of the product. The avoidance of too low tension may be accomplished as hereinabove described, by adjustment of the relative speeds of the forwarding and take-up rolls, etc. It is desirable for the purpose of this invention that the tension in the yarn bundle during interlacing be less than about 0.65 g.p.d. and preferably less than about 0.1 g.p.d., but not less than about 0.01 g.p.d. to 0.02 g.p.d. to avoid the possibility of slackness. At about 0.05 g.p.d. to 0.10 g.p.d. tension and with not net mechanical overfeed, optimum interlacing is achieved for most textile denier yarns, and the product is firmly established and "locked in" during processing.

If a product having variable interlace density or containing segments of little or no interlacing is needed, reduced and/or varying tensions may be desirable. A novel yarn having increased bulk can be produced during plying by feeding the component yarns to the interlacer at different tensions, so that one component is interlaced to a lesser extent than the other(s). In such a process, the yarn under the greatest tension becomes the load-bearing member, while the yarn(s) under less tension are interlaced about this member in the manner of a loose sheath, thereby determining the surface character, hand, etc., of the plied yarn. Also, by the similar techniques, a plied yarn having greatly enhanced bulk is prepared by feeding one component yarn slack or by overfeeding that component, so that the sheath is comprised of loops, whorls, etc. Such a yarn exhibits the structural retentivity characteristic of a typical interlaced yarn, but has the bulk and hand of a textured yarn. Preferably, the "sheath" component need not be expensive nor be as tenacious as the load-bearing or "core" yarn. During any interlacing-plying operation, the feed yarns may be colored differently or have differential mechanical properties, e.g., shrinkage, so that the resultant plied structures exhibit interesting novelty effects together with enhanced utility.

If yarn tension is too high and/or the fluid pressure is too low to achieve the desired degree of interlacing, it is often possible to alleviate such difficulties by plasticizing the yarn prior to the interlacing step. Such plasticizing may be accomplished in some cases merely by wetting and/or heating the yarn, or by the application of solutions of chemical plasticizers. Often the presence of residual solvent in the yarn is sufficient for this purpose. Where heating is employed, means such as a hot pin or pipe, a steam tube, an oven, a hot liquid bath, infrared heaters and the like may be employed. Naturally, the yarn should not be heated to an extent deleterious to its structure.

The nature of the yarn being interlaced determines to some extent the density of interlacing in products, depending on the bending and torsional moduli of the filaments. Since these moduli are temperature dependent, interlacing takes place more readily at elevated temperatures, as indicated earlier. The yarn finish also influences the extent of interlacing, since the over-all phenomenon is believed also to depend on interfilament friction. Where the interfilament friction is high, such as is the case when the finish application is incomplete or when the yarn tension is at a high level, the interlaced configuration is not propagated to an appreciable extent along the length yarn axis, up and downstream from the interlacer, and there is observed in addition a concomitant decrease in interlacing density. The degree of interlacing may be increased by increasing the number of fluid jets acting upon the yarn, by placing the jets closer together and by increasing the density of the fluid utilized. The effect of filament-to-filament friction can be overcome by an increase in fluid pressure or a decrease in yarn tension. The interlacing density is seen to increase with such changes. The propagation distance and hence the interlacing density also increase with lower denier per filament and increased bundle opening, which attends an increase in fluid pressure, a decrease in tension, or by use of directed exhausting of the fluid, e.g., when utilizing the apparatus of FIGURES 13, 14, or 15.

An as-produced interlaced multifilament yarn usually is free from loops, crimps, whorls, and the like filament configurations, is exceptionally cohesive, and exhibits handling and running characteristics at least the equal to those of the conventional true twisted yarns having ½ turn per inch (t.p.i.) or more. By virtue of the twisted and intermingled filaments in the yarn bundle, an interlaced yarn is stable under tension even when subjected to conventional hot or cold drawing operations. Consequently, the interlaced structure is essentially retained throughout most of the conventional textile operations and is fully the equal of and in some cases superior to true twist yarns in performance.

The retentiveness of structure of interlaced yarns of this invention is even further enhanced by tensioning. Although rarely necessary, the interlaced structure can be "set" by various methods. In the case of upstream plasticizing, setting takes place upon cooling the yarn and/or removal of plasticizer. Sufficient cooling to cause a satisfactory "set" takes place in the vicinity of the interlacer, owing to the presence of exhausting fluid. Volatile plasticizers are also removed in this manner. Such setting is beneficial in instances where subsequent retensioning is not anticipated and/or process tension during interlacing is of a relatively low order. The interlaced structure may be mechanically "set" by incorporating a high shrinkage component in the yarn, then subsequently heating, steaming, or boiling the yarn to induce shrinkage of that component. When such shrinkage takes place, the bundle interlace is enhanced as in retensioning, with the low shrinkage component bulking to some extent. If the total yarn composition exhibits appreciable uniform shrinkage, then upon shrinking, the interlace becomes more permanent without such bulking, the effect being analogous to tensioning. When it is desired to interlace a low denier yarn which lacks mechanical strength, i.e., one which is likely to be degraded or otherwise damaged by the process, it is possible to incorporate a supporting component in the yarn. Such a supporting component is later removed, by heating or dissolving it out, and the remaining yarn is retensioned to provide the desired product. This method is practiced, for example, with very fine yarns or yarns having a high filament count to denier ratio. The supporting yarn could be cellulose acetate, which is readily soluble in acetone. Similarly, an infusible yarn can be supported by one which is readily fusible.

Many novelty yarns can be prepared by introducing staple fibers during the interlacing of filament yarn. Such fibers can be introduced through a hopper situated near the interlacer, but preferably are introduced through the fluid conduit or an auxiliary conduit which opens into the zone of controlled fluid turbulence. The staple fibers may be slurried in the interlacing fluid, or merely introduced into the turbulent zone. The fibers are interlaced into the filament yarn bundle, and substantially permanently retained. The resulting yarn has the appearance and hand of a staple or spun yarn, with cohesiveness, retentivity, and mechanical properties characteristic of an interlaced yarn. Thus, the benefits of both staple and filament yarns are achieved in a single structure.

The process of this invention enables the production of an interlaced yarn which has handling and running characteristics at least the equal of true twisted yarn. The process can be used to interlace, ply or blend, staple or continuous filament yarns, the product novelty items such as variable denier yarns, slub yarns, thick and thin yarns, etc. It can be practiced with intermittency of the process variables to produce a yarn of varying interlacing density, or with non-homogeneous structures to produce a bulky structure. The simplicity of this process permits its use at any point in yarn manufacturing or winding with no interruption of processing routine and little outlay for new equipment. Distinct process advantages are that it requires little supervision or maintenance, and does not demand temperature or humidity control.

The products of this invention can be prepared from any natural or synthetic filamentary material. Exemplary materials include polyamides, e.g., poly(epsilon caproamide) and poly(hexamethylene adipamide); cellulose esters, e.g., cellulose acetate; polyesters, particularly polyesters of terephthalic acid or isophthalic acid and a lower glycol, e.g., poly(ethylene terephthalate), poly(hexahydro-p-xylylene terephthalate); polyalkylenes, e.g., polyethylene, linear polypropylene, poly(tetrafluoro ethylene), etc.; polyvinyls and polyacrylics, e.g., polyacrylonitrile, as well as copolymers of acrylonitrile and other copolymerizable monomers can be used. It is useful with elastomeric structures since the interlacing provides a compact unitary structure without appreciably decreasing the elasticity of the yarn, and can be produced at low operating tensions. Yarns useful in this process include those having Y, cruciform, propeller, or otherwise modified cross sections. Also, filaments comprising poly(ethylene-2,6-naphthalate); poly(tetrachlorodiphenylol propane isophthalate); the polyester reaction product of ethylene glycol, terephthalic acid and dibenzoic acid; the polyamide from bis(p-aminocyclohexyl)methane and azelaic acid; the block copolymer from poly(hexamethylene adipamide) and poly(hexamethylene isophthalamide); poly(hexamethylene adipamide) containing a phenol formaldehyde resin; and poly(m-xylylene adipamide) to name a few. Such yarns interlace at a high rate due to their irregular surface and increased surface area. Yarn to be interlaced may contain any of the usual textile additives, e.g., delusterants, antioxidants, etc., and may be "finished" in accordance with accepted practice. Although quite a wide range of yarn denier and filament count may be used, when extremely large or small yarn bundles are interlaced, interlacer dimensions should be adjusted according to the foregoing discussion. Natural fibers such as wool, cotton, asbestos, silk or fiber glass and metallic filaments may also be used.

The apparatus of this invention is inexpensive, requires little maintenance, requires no moving or rotating parts, minimizes yarn contact (no yarn degradation), is practically instantaneous in its action, and is very economical to operate. Moreover, such interlacers are readily adapted to operate on extremely close centers, as required in warp interlacing. Such interlacers are simple to fabricate, requiring only drilling in many cases.

The interlaced yarn of this invention is useful in all applications which require a twisted yarn, i.e., those in which the handling and running characteristics of nominal zero-twist yarn are not satisfactory. An interlaced yarn can be prepared rapidly and continuously, and the interlaced structure is stable and resists removal by application of tension. Numerous novelty yarns may be prepared by plying or blending staple filament yarns during interlacing, these effects being amplified where the component yarns are of different colors or properties. Interlaced yarn processes normally, and can be sized, set, packaged, woven, knitted, and twisted like any other yarn. Use in a tow of yarn permits subsequent breakdown of the tow into the component yarns, after washing, drying, drawing, dyeing by virtue of the end consolidation provided by the interlacing. Most important, it can be produced at about the same cost as conventional zero-twist yarn. Further advantages inherent in the use of the product, process, and apparatus of this invention will readily occur to those undertaking its practice.

The feed yarn will normally be zero-twist yarn directly from producers' spinning and/or drawing operation. This interlacing process can also be used, however, to upgrade producer twist or other levels of twist. For example, it will frequently be desired to take a 3 t.p.i. or ½ t.p.i. producer yarn or 2½ t.p.i. bucket rayon and interlace to a degree that the running properties are equivalent to yarns having 5 to 10 t.p.i. or higher.

To a certain degree at room temperature and to a much greater degree at elevated temperature, the process of this invention can be used to achieve a dynamic relaxation of the yarn. But even at room temperature, this dynamic working of the yarn tends to even out non-uniformity in structure and yarn dyeing variations without any cross-sectional configuration distortions.

The following examples illustrate various methods of producing interlaced yarns in accordance with this invention, and show the effects of varying yarn tension, air pressure, yarn speed, etc., on the density of interlacing observed in the product. In all examples, yarn is passed through the interlacer without net mechanical overfeed. The conditions and results of these tests are given in Table I in which the interlacers are identified as follows:

Interlacer A is shown in FIGURES 30 and 31 and has a rectangular or slotwise yarn passageway which is 3½" in length, and ¼" deep, intercepted by six fluid conduits alternately spaced on ½" centers along the length of the yarn passageway, each of the fluid conduits having its longitudinal axis 3/32" from the floor of the yarn passageway.

Interlacer B is shown in FIGURES 1 and 3, is ¼" in length, and is intercepted at its lengthwise midpoint by a pair of opposed (180°) fluid conduits.

Interlacer C, shown in FIGURES 8 and 9, is ½" in length, and is intercepted ⅛" from each end by 2 pairs of opposed (180°) fluid conduits, the separate pairs having their common longitudinal axis at 90°, each with respect to the other.

Interlacer D is the same as interlacer C except that the separate pairs of fluid conduits have their common longitudinal axes parallel to one another.

Interlacer E is similar to interlacer C, but has only a single fluid conduit.

Interlacer F is similar to interlacer A, but is 6½" long, with the yarn passageway being intercepted by 6 fluid conduits spaced on 1" centers along one side of the yarn passageway.

Interlacer G is similar to interlacer F, except that the two end fluid conduits are blocked off. The width or diameter of the yarn passageway and fluid conduit(s) of each of the above interlacers is given in Table I. Regarding their relative efficiencies, interlacers C and D give optimum results at high yarn speeds, while the remaining interlacers perform best at somewhat lower speeds.

TABLE I

| Runs | Inter-lacer | Diameter or Width Yarn Passage-way, in. | Diameter Fluid Cond., in. | Yarn Den./Fil. | Air Pressure, p.s.i.g. | Tension, Grams | Speed Yarn, y.p.m. | Interlace Density |
|---|---|---|---|---|---|---|---|---|
| 1 | A | 0.040 | 0.030 | cellulose acetate, 150/40. | 10 | 4 | 517 | slight. |
| 2 | A | 0.040 | 0.030 | -----do----------- | 20 | 4 | 517 | light. |
| 3 | A | 0.040 | 0.030 | -----do----------- | 30 | 4 | 517 | moderate. |
| 4 | A | 0.040 | 0.030 | -----do----------- | 40 | 4 | 517 | medium. |
| 5 | A | 0.040 | 0.030 | -----do----------- | 50 | 4 | 517 | heavy. |
| 6 | A | 0.040 | 0.030 | -----do----------- | 60 | 4 | 517 | very heavy. |
| 7 | A | 0.040 | 0.030 | -----do----------- | 70 | 4 | 517 | Do. |
| 8 | B | 0.025 | 0.025 | -----do----------- | 10 | 4 | 517 | slight. |
| 9 | B | 0.025 | 0.025 | -----do----------- | 20 | 4 | 517 | light. |
| 10 | B | 0.025 | 0.025 | -----do----------- | 30 | 4 | 517 | moderate-medium. |
| 11 | B | 0.025 | 0.025 | -----do----------- | 40 | 4 | 517 | medium-heavy. |
| 12 | B | 0.025 | 0.025 | -----do----------- | 50 | 4 | 517 | Do. |
| 13 | B | 0.025 | 0.025 | -----do----------- | 60 | 4 | 517 | very heavy. |
| 14 | B | 0.025 | 0.025 | -----do----------- | 70 | 4 | 517 | Do. |
| 15 | C | 0.052 | 0.025 | 66-nylon, 55/17 | 100 | 13 | 2,000 | heavy. |
| 16 | C | 0.052 | 0.025 | -----do----------- | 100 | 15 | 3,000 | Do. |
| 17 | C | 0.052 | 0.025 | -----do----------- | 100 | 19 | 4,000 | Do. |
| 18 | C | 0.052 | 0.025 | -----do----------- | 100 | 19 | 5,000 | medium-heavy. |
| 19 | C | 0.052 | 0.025 | -----do----------- | 100 | 23 | 500 | medium. |
| 20 | C | 0.052 | 0.025 | as 1 | 90 | 12 | 2,000 | heavy. |
| 21 | C | 0.052 | 0.025 | 66-nylon, 70/34 | 90 | 13 | 5,000 | Do. |
| 22 | C | 0.052 | 0.025 | -----do----------- | 90 | 11 | 3,500 | Do. |
| 23 | C | 0.052 | 0.025 | -----do----------- | 90 | 16 | 3,000 | medium. |
| 24 | D | 0.052 | 0.025 | -----do----------- | 90 | 12 | 3,500 | medium-heavy. |
| 25 | D | 0.052 | 0.025 | -----do----------- | 90 | 10 | 3,000 | heavy. |
| 26 | B | 0.052 | 0.025 | as 1 | 70 | 4 | 600 | medium. |
| 27 | F | 0.040 | 0.030 | -----do----------- | 90 | 10 | 500 | heavy. |
| 28 | G | 0.040 | 0.030 | -----do----------- | 90 | 10 | 500 | medium. |
| 29 | A | 0.040 | 0.030 | 66-nylon, 50/17 | 60 | 10 | 950 | heavy. |
| 30 | C | 0.052 | 0.025 | -----do----------- | 15 | 10 | 950 | moderate. |
| 31 | C | 0.052 | 0.025 | 66-nylon, 70/34 | 60 | 10 | 950 | heavy. |
| 32 | A | 0.040 | 0.030 | cellulose acetate 300/80, 5 t.p.i. | 100 | 10 | 100 | Do. |
| 33 | A | 0.040 | 0.030 | -----do----------- | 75 | 10 | 100 | moderate. |

In runs 1 through 14, the yarns are interlaced immediately after spinning prior to packaging, using the apparatus shown generally in FIGURE 40. In runs 30 and 31, the yarns are interlaced immediately after drawing, prior to packaging, with an apparatus similar to that shown in FIGURE 39. Runs 15–29 are interlaced during rewinding; and runs 32 and 33 show interlacing a twisted yarn.

In additional runs, the "wheel" interlacer shown in FIGURES 10 and 13 is utilized to prepare 150-denier, 40-filament interlaced cellulose acetate yarn, having a moderate density of interlacing, at a yarn speed of 500 yards per minute (y.p.m.). The diameter of the wheel 11 is 2½", the slotted yarn passageway 12 is ¼" deep, and the fluid conduits, 13, 13a, etc., are 0.030" in diameter at their points of intersection with yarn passageway 12. The fluid conduits are spaced regularly about the wheel, alternately in the opposing walls of the yarn passageway, and their respective centers lie on a circle 2 3/32" in diameter. Various process conditions employed with this interlacer are indicated in Table II.

TABLE II

| Run | No. of Conduits | Slot Width, in. | Wheel Speed, r.p.m. | Wrap angle "A" in Degrees | Air Pressure, p.s.i.g. | Tension, Grams |
|---|---|---|---|---|---|---|
| 34 | 8 | 0.040 | 2,850 | 74 | 60 | 8 |
| 35 | 8 | 0.060 | 2,850 | 92 | 60 | 8 |
| 36 | 8 | 0.030 | 2,850 | 116 | 60 | 10 |
| 37 | 8 | 0.040 | 2,850 | 116 | 60 | 10 |
| 38 | 8 | 0.040 | 2,850 | 150 | 60 | 10 |
| 39 | 16 | 0.040 | 2,850 | 92 | 40 | 10 |
| 40 | 16 | 0.040 | 2,850 | 90 | 60 | 10 |
| 41 | 16 | 0.040 | 5,700 | 90 | 50 | 10 |
| 42 | 16 | 0.040 | 2,850 | 120 | 40 | 10 |

The interlaced yarns prepared by the above runs were rated for increasing density of interlacing, based on known practical utility, using the relative terms "slight," "light," "moderate," "medium," "heavy," etc., as indicated in the last column of Table I. Yarns rated as having "moderate" interlace density were found to perform at least as well as corresponding conventional yarn of 2 turns per inch twist (differing only in being twisted instead of interlaced) when compared in commercial operation for mechanical performance during knitting and weaving, runability, fabric quality, and handling behavior in general. Yarns of "medium" to "heavy" interlace density were similarly suitable for uses previously served by the more highly twisted conventional yarns of moderate to heavy twist intensities. The "light" interlace density was found to be highly effective as a replacement for producer's twist in corresponding uses of the yarn. A numerical characterization of interlace density was subsequently evolved to permit comparisons in a manner similar to the conventional use of twist intensity. As determined by the test about to be described, a "coherency factor" of about 2.5 to 7 corresponds to the above rating of "light" interlace density, a value of about 7 to 20 corresponds to the above rating of "moderate," a value of about 20 to 50 corresponds to "medium," and higher values correspond to "heavy" interlace density.

*Hook Drop Characterization of Interlace Density*

The hook-drop test is based on the distance a weighted hook inserted through a yarn bundle can be lowered before the weight of the hook is supported by the resistance of the yarn to further passage of the hook down the yarn. The result is expressed as a "coherency factor," which is calculated as 100 divided by this distance in centimeters so that greater coherency is indicated by higher values. The analogy to the effect of increasing the twist of conventional yarn is apparent.

Since filament interlacing is random in nature and may be varied by the mechanical handling to which it is subjected, a large number of samples should be obtained so as to provide representative results. Approximately 1000 yards are unwound off a yarn package so as to expose fresh, clean, undamaged yarn, the last 100 yards being unwound at a rate no greater than 50 yards per minute so that surface abrasion of the yarn is avoided. Samples are then tested at regular intervals along the yarn until enough samples have been tested to give the required precision. For each of the values reported hereinafter, 100 tests were made. In order to eliminate the effect of twist, any twist is carefully removed so that each sample is reduced to a condition of substantially zero twist prior to testing.

One end of a test sample approximately 100 centimeters long is fastened adjacent to the upper end of a vertical scale graduated in centimeters. The lower end of the sample is weighted with a weight in grams numerically equal to 0.20 times the denier of the yarn, but having a total weight not greater than 100 grams (when the yarn denier exceeds 500). The pressure at points of attachment should be only sufficient to hold the yarn in place without yarn damage; a smooth resilient surface is most desirable. At a point 0.5–1.0 centimeter below the yarn attachment at the upper end of the scale, the yarn bundle is carefully separated with a pointed instrument so that at least one-third of the total number of filaments is on each side of the point of division. Into this separation is inserted a weighted hook having a total weight in grams numerically equal to the mean denier per filament of the yarn, but weighing not greater than 10 grams (when the mean denier per filament exceeds 10).

The weighted hook is then lowered at a rate of 1 to 2 centimeters per second until the weight of the hook is supported by the yarn. The hook-drop distance thereby traversed through the yarn bundle, from the original point of separation to the point of rest, is recorded. The test is repeated with additional yarn samples until 100 results are obtained in accurate testing. The highest 20% and the lowest 20% of the hook-drop distances are eliminated and an average of the remaining values is taken as representative of the yarn. The coherency factor is 100 divided by this average value in centimeters. Obviously, if the hook-drop distance for a sample is greater than 100 cm. (as for yarn having a coherency factor of less than 1), a longer sample should be tested. The yarn and hook can be carefully raised and the yarn reclamped with the hook again at the top of the scale in order to continue a test. The foregoing test is hereinafter referred to in the claims as "the hook-drop test".

Runs 43–46 are summarized in Table III. Cellulose acetate zero twist yarn, of the indicated denier and number of filaments, was interlaced with the jet shown in FIGURE 38 of the drawing under the conditions shown in the table. The heading "Yarn Length" refers to the distance between yarn guides before and after the jet, and includes the jet length.

TABLE III

| Run | Yarn Denier | No. of Fils. | Tension on yarn, grams | Yarn Speed, y.p.m. | Air Pres., p.s.i.g. | Yarn Length, cm. | Coherency Factor |
|---|---|---|---|---|---|---|---|
| 43 | 40 | 13 | 6 | 700 | 18 | 25 | 27.8 |
| 44 | 75 | 24 | 8 | 739 | 18 | 25 | 14.3 |
| 45 | 150 | 40 | 10 | 319 | 35 | 25 | 34.5 |
| 46 | 300 | 80 | 25 | 375 | 30 | 25 | 4.3 |

Runs 47–50 are summarized in Table IV. Poly-(ethylene terephthalate) zero twist yarn was interlaced with the jet disclosed in FIGURES III and IV of our copending application Serial No. 5811, filed February 1, 1960, using an air flow countercurrent to the direction of yarn travel. The other conditions are shown as in the previous table.

TABLE IV

| Run | Yarn Denier | No. of Fils. | Tension on yarn, grams | Yarn Speed, y.p.m. | Air Pres., p.s.i.g. | Yarn Length, cm. | Coherency Factor |
|---|---|---|---|---|---|---|---|
| 47 | 70 | 34 | 38 | 2,750 | 25 | 9 | 3.8 |
| 48 | 70 | 34 | 38 | 2,750 | 70 | 9 | 22.2 |
| 49 | 150 | 34 | 60 | 2,750 | 60 | 9 | 3.5 |
| 50 | 150 | 34 | 60 | 2,750 | 90 | 9 | 5.0 |

Runs 51–54 are summarized in Table V. Polyhexamethyleneadipamide (66 nylon) zero twist yarn was interlaced with a jet similar in design and operation to that of runs 47–50. Other conditions are given in the table.

TABLE V

| Run | Yarn Denier | No. of Fils. | Tension on yarn, grams | Yarn Speed, y.p.m. | Air Pres., p.s.i.g. | Yarn Length, cm. | Coherency Factor |
|---|---|---|---|---|---|---|---|
| 51 | 70 | 34 | 17 | 3,000 | 14 | 12 | 12.7 |
| 52 | 200 | 20 | 10 | 200 | 20 | 5 | 25.0 |
| 53 | 840 | 140 | 100 | 2,100 | 35 | 10 | 13.3 |
| 54 | 840 | 140 | 100 | 2,100 | 80 | 10 | 71.4 |

Runs 55–60 are summarized in Table VI. Polyhexamethyleneadipamide (66 nylon) yarn, zero twist for runs 55–59 and ½ t.p.i. twist for run 60, was interlaced with the jet disclosed in FIGURE 14 and in our copending application Serial No. 5,811, filed February 1, 1960. The yarn of run 56 was composed of trilobal cross-section filaments, whereas the other yarns had nominally round cross-sections. Other conditions are given in the table.

TABLE VI

| Run | Yarn Denier | No. of Fils. | Tension on yarn, grams | Yarn Speed, y.p.m. | Air Pres., p.s.i.g. | Yarn Length, cm. | Coherency Factor |
|---|---|---|---|---|---|---|---|
| 55 | 40 | 13 | 6 | 914 | 10 | 60 | 38.5 |
| 56 | 70 | 34 | 5 | 901 | 10 | 10 | 3.8 |
| 57 | 70 | 34 | 5 | 1,200 | 9 | 10 | 32.3 |
| 58 | 70 | 34 | 6 | 1,209 | 11 | 10 | 30.3 |
| 59 | 840 | 140 | 50 | 300 | 40 | 13 | 18.8 |
| 60 | 50 | 17 | 4 | 1,450 | 19 | 9 | 14.6 |

Runs 61–64 are summarized in Table VII. Polyhexamethyleneadipamide (66 nylon) zero twist yarn was interlaced with the following jets:

Run 61, two of the jets shown in FIG. 38 in series.

Run 62, two of the thin slot jets shown in FIGS. 15 and 16 in series.

Run 63, the jet shown in FIGS. 34 and 35.

Run 64, the jet shown in FIG. 38 of the drawing.

Other conditions are given in the table.

TABLE VII

| Run | Yarn Denier | No. of Fils. | Tension on yarn, grams | Yarn Speed, y.p.m. | Air Pres., p.s.i.g. | Yarn Length, cm. | Coherency Factor |
|---|---|---|---|---|---|---|---|
| 61 | 70 | 34 | 17 | 3,000 | 20 | 12 | 16.7 |
| 62 | 70 | 34 | 5 | 1,175 | 8 | 3 | 6.4 |
| 63 | 70 | 34 | 9 | 500 | 10 | 2 | 15.4 |
| 64 | 200 | 20 | 10 | 300 | 25 | 11 | 26.0 |

Runs 65–69 illustrate interlacing of various twisted yarns with different jets as follows:

In run 65, viscose rayon yarn having 2½ turns per inch of twist was interlaced with the jet disclosed in FIGURE 14 and in our copending application Serial No. 5,811, filed February 1, 1960.

In run 66, cellulose acetate yarn having 2 turns per inch of twist was interlaced with the jet shown in FIGURE 38 of the present application.

In run 67, polyacrylonitrile yarn having 5.2 turns per inch of twist was interlaced with the jet disclosed in FIGURES III and IV of our copending application Serial No. 5,811, using countercurrent flow of air.

In run 68, polyacrylonitrile yarn having 0.3 turn per inch of twist was interlaced with the jet of run 67.

In run 69, polycaproamide (6 nylon) yarn having ½ turn per inch of twist was interlaced with the jet of run 67. Other conditions are shown in Table VIII.

TABLE VIII

| Run | Yarn Denier | No. of Fils. | Tension on yarn, grams | Yarn Speed, y.p.m. | Air Pres., p.s.i.g. | Yarn Length, cm. | Coherency Factor |
|---|---|---|---|---|---|---|---|
| 65 | 150 | 40 | 10 | 700 | 30 | 5 | 66.7 |
| 66 | 100 | 28 | 22 | 360 | 21 | 8 | 12.9 |
| 67 | 202 | 96 | 24 | 295 | 14 | 10 | 21.0 |
| 68 | 200 | 80 | 25 | 620 | 45 | 8 | 18.7 |
| 69 | 30 | 6 | 3 | 425 | 22 | 6 | 4.7 |

Runs 70–75 of Table IX illustrate the preparation of very tightly interlaced yarn by using heated air in the jet of FIGURE 38. The jet had a yarn tube diameter of 0.050 inch, and an orifice size of 0.050 inch. The air temperature was measured as supplied to the jet before expansion in the jet. The yarn was 70-denier, 34-filament, zero twist polyhexamethyleneadipamide (66 nylon) yarn with a standard finish. The type of interlace produced is periodic.

TABLE IX

| Run | Yarn Speed, y.p.m. | Yarn Tension, grams | Air Pressure, p.s.i.g. | Air Temperature, °F. | Coherency Factor |
|---|---|---|---|---|---|
| 70 | 700 | 5 | 60 | 1,100 | 670 |
| 71 | 500 | 2 | 60 | 800 | 521 |
| 72 | 550 | 5 | 60 | 900 | 400 |
| 73 | 500 | 5 | 60 | 800 | 294 |
| 74 | 500 | 5 | 60 | 600 | 224 |
| 75 | 500 | 5 | 60 | 100 | 110 |

Staple interlaced yarn was made by drafting short lengths of poly(ethylene terephthalate) fibers into the jet shown in FIGURE 38 in which the yarn passage diameter was 0.050 inch while the air passages were 0.050 inch. Staple filaments averaging 3 inches long and 2 denier per filament were fed as a roving to drafting rolls, passed through the jet for interlacing into yarn, and the yarn was wound up under a controlled tension of 2 to 3 grams. Air was supplied to the jet at 50 pounds per square inch gage. The jet was in such relation to the drafting rolls that withdrawal of interlaced staple yarn from the jet would draw staple fibers into the jet continuously from the drafting rolls. By adjusting the rate of drafting, staple yarns of various cotton counts were made: 6/1 c.c., 8/1 c.c., 16/1 c.c. and 27/1 c.c. staple interlaced yarns were produced. The yarns were very heavily interlaced, having coherency factors well in excess of 100 when tested by the hook drop test. Under a microscope the yarn exhibited a random closely-braided structure with fuzzy protruding filament ends.

Light to moderately interlaced yarns were prepared, using various conditions and types of commercial yarns, and evaluated for the frequency of filament intermingling events per inch of yarn by the successive cross-sections yarn evaluation method described near the end of the specification. In runs 76–80, poly(ethylene terephthalate) zero twist yarns were interlaced with jets of the type disclosed in FIGURES III and IV of our copending application Serial No. 5,811, filed February 1, 1960, using countercurrent flow of air. In runs 81, 82 and 83, polyhexamethyleneadipamide (66 nylon) zero twist yarn was interlaced with three different jets: Run 81 used 2 jets of the type shown in FIGURE 38, in series; run 82 used a single jet of the type shown in FIGURE 14; and run 83 used 2 jets of the type shown in FIGURES 15 and 16, in series. In runs 84 and 85 cellulose acetate zero twist yarns were interlaced with single jets of the type shown in FIGURE 38. The other conditions and the results of the structural evaluation are given in Table X. These results cannot be compared directly with the previous evaluations by the hook drop test. Obviously the coherency factor represents a combination of characteristics which produce hook-stopping entanglement, and does not depend solely on the gross number of filament intermingling events per inch of yarn.

TABLE X

| Run | Yarn Denier | No. of Fils. | Tension on yarn, grams | Yarn Speed, y.p.m. | Air Pres., p.s.i.g. | Yarn Length, cm. | Intermingling Events/inch of yarn |
|---|---|---|---|---|---|---|---|
| 76 | 40 | 27 | 35 | 2,750 | 25 | 9 | 67 |
| 77 | 70 | 14 | 40 | 2,750 | 90 | 9 | 18 |
| 78 | 70 | 34 | 38 | 2,750 | 70 | 9 | 107 |
| 79 | 70 | 50 | 38 | 2,750 | 40 | 9 | 166 |
| 80 | 150 | 34 | 60 | 2,750 | 90 | 9 | 90 |
| 81 | 70 | 24 | 17 | 3,000 | 20 | 12 | 167 |
| 82 | 70 | 34 | 5 | 1,200 | 9 | 10 | 111 |
| 83 | 70 | 34 | 5 | 1,175 | 8 | 3 | 83 |
| 84 | 40 | 13 | 6 | 700 | 18 | 25 | 31.5 |
| 85 | 75 | 24 | 8 | 739 | 18 | 25 | 60 |

In further tests, interlacing is employed to prepare plied yarn bundles of red and white yarns, to enable visual determination of the thoroughness of plying and interlacing. The interlacer F described in connection with Table I (0.040″ wide, 0.030″ long yarn passageway, six 0.030″ fluid conduits) is used to ply 1 end of red and 1 end of white 75/24 cellulose acetate yarn at 500 y.p.m., 10 grams tension, and 90 p.s.i.g. air pressure. The product shows "heavy" interlace density, and appears a uniform pink to the observer. With interlacer G described in connection with Table I, which is designed like interlacer F, but has only four fluid conduits, under the same conditions a "medium" density product is produced, wherein the red and white filaments are discernible, i.e., the resulting yarn is a non-uniform pink in color. Where interlacer C described in connection with Table I (yarn passageway 0.052″ in diameter, fluid conduits 0.025″ in diameter) is used to ply an end each of red 75/24 cellulose acetate and white 70/34 nylon at 2000 y.p.m., 8–10 grams tension, and using 90 p.s.i.g. air, a "moderate" interlaced product is obtained, the plying being somewhat irregular. Preferably, plying is carried out at reduced speeds.

Further, the interlacer shown in FIGURE 33 is used in combination with a vibrating reed to ply and interlace a feed of 1 white 70/34 poly(ethylene terephthalate) yarn and 1 red 75/24 cellulose acetate. This interlacer 11 has two 0.030″ diameter cylindrical yarn passageways 12 and 12a which are ¼″ long and have their respective centers spaced 0.030″ apart. The fluid conduits 13 and 13a are 0.017″ x 0.032″ at their orifices. The yarn string-up slot 22 is 0.004″ wide. The yarns are fed at 500 y.p.m., each under 10 grams tension, using air at 80–100 p.s.i.g. pressure. When the reed is vibrated at a frequency of 50 c.p.s., the interlace density is judged "medium." Where the reed is vibrated at 75 c.p.s., the interlace density is determined as "heavy." In both cases, the plying is relatively thorough, the product appearing a uniform pink color to the observer.

The above process can also be used to ply a number of yarns into a ribbon or fabric of any desired width or tubular fabric of various diameters. A warp of multifilament threadlines is passed through a slot or annulus in which a plurality of jets, arranged closely together in side-by-side relationship, impinge on the warp ends so that adjacent ends are interlaced together to form a nonwoven fabric. A beam of 460 ends of 75-denier, 24-filament, 3/4 turn per inch of true twist, cellulose acetate yarn was combined at convergence guides with a beam of yarn which differed only in having 1 turn per inch of true twist. The combined 920 ends were passed through the convergence guides to the interlacing jets and on through piddler rolls to a suitable container below the piddler. The yarn ends were interlaced together at a yarn tension of less than 30 grams under various air pressure from 10 to 100 p.s.i.g. The warp sheet produced showed substantial filament intermingling between the adjacent yarn ends. The resistance to separation in the normal fill direction ranged from low to considerable, depending upon the air pressure. In a similar manner, a beam of 840-denier, 140-filament, zero twist, industrial tire cords of 66 nylon was plied and interlaced into a fabric of 64 cord ends per inch of fabric width. The resistance to separation was such that the non-woven fabric was suitable for coating with rubber and use in tire construction, thus eliminating the conventional step of weaving the plies of tire fabric.

In addition to its other desirable features, an important advantage of the interlacing process is that yarn can be effectively processed continuously at high or low speed, so that the process can be combined with other yarn treatments without modifying the yarn speed normally used in the latter. The combination in which interlacing follows yarn drawing has been discussed in connection with FIGURE 39. The two can also be combined in other ways. Table XI summarizes runs 86–97 in which yarns were interlaced and then drawn in a continuous operation. The filament-to-filament friction, and the substantial absence of relative motion between filaments during drawing, resulted in retention of interlace even under the tensions used. In each of these runs, undrawn 66 nylon 309 denier yarn of 34 filaments was fed at 500 yards per minute through one or more interlacing jets of the type shown in FIGURE 14, passed over a feed roll to a heater, was drawn by a conventional combination of draw rolls and a relax roll to 70 denier yarn, and was wound up at a speed of 2150 yards per minute. A finish roll applied 0.5% of conventional finish to the yarn prior to the interlacing jet.

The jet orifice diameters were 0.035 inch and the plate spacing or slot width was 0.040 inch. In runs 86–90 a single interlacing jet was used. In runs 91–95 the yarn was split and passed through 2 jets in parallel for interlacing. In runs 96 and 97 the yarn was divided into 4 groups of 8 or 9 filaments each and interlaced by 4 jets in parallel. Other conditions are given in the table. It will be noted that runs 90 and 95 were controls in which substantially no air was supplied to the jets, hence no interlacing took place. The interlaced yarns were woven into fabric as fill and the fabrics were compared. The yarns of runs 86–89 were observed to quill and weave satisfactorily as if they were twisted yarn, but the yarns of runs 91–94 (interlaced with 2 jets in parallel) processed more uniformly. The yarns of runs 96 and 97 (interlaced with 4 jets in parallel) gave the most uniform fabrics.

TABLE XI

| Run | No. of Fils. Per Jet | Air Pres., (p.s.i.g.) | Tension at Jet, grams | Coherency Factor After Drawing | Type of Interlace Produced |
|---|---|---|---|---|---|
| 86 | 34 | 40 | 5 | 43.5 | Periodic, medium. |
| 87 | 34 | 30 | 5 | 20.0 | Do. |
| 88 | 34 | 20 | 5 | 8.8 | Continuous, moderate. |
| 89 | 34 | 10 | 5 | 1.8 | Continuous, light. |
| 90 | 34 | None | 5 | 0.5 | None. |
| 91 | 17 | 40 | 5 | 55.5 | Periodic, heavy. |
| 92 | 17 | 30 | 5 | 26.5 | Periodic, medium. |
| 93 | 17 | 20 | 5 | 5.9 | Continuous, moderate. |
| 94 | 17 | 10 | 5 | 1.7 | Continuous, light. |
| 95 | 17 | 1 | 5 | 0.5 | None. |
| 96 | 8 or 9 | 20 | 5 | 12.5 | Continuous, moderate. |
| 97 | 8 or 9 | 15 | 5 | 4.0 | Continuous, light. |

The yarns interlaced before drawing can be further interlaced after drawing. In the case of yarns processed as in runs 91–97, this additive interlacing also serves to interlace the separately interlaced groups together into a unitary yarn of greater cohesiveness. Table XII summarizes runs 98–102 in which yarn was interlaced and drawn as in runs 91, 92, 93, 94 and 96, respectively, and was further interlaced by passing it through 2 jets of the type shown in FIGURE 38 arranged in series between the draw rolls and the wind-up rolls. The feed was 309-denier undrawn 66 nylon yarn with 0.5% of conventional finish.

TABLE XII

| Run Number | 98 | 99 | 100 | 101 | 102 |
|---|---|---|---|---|---|
| Yarn speed to predraw interlace jets (y.p.m.) | 500 | 500 | 500 | 500 | 500 |
| Total No. yarn filaments | 34 | 34 | 34 | 34 | 34 |
| No. of jets in parallel | 2 | 2 | 2 | 2 | 4 |
| No. filaments per jet | 17 | 17 | 17 | 17 | 8 or 9 |
| Air Pressure (p.s.i.g.) | 40 | 30 | 20 | 10 | 20 |
| Tension at jet (grams) | 5 | 5 | 5 | 5 | 5 |
| Drawn yarn denier | 70 | 70 | 70 | 70 | 70 |
| Speed to final jets (y.p.m.) | 2,150 | 2,150 | 2,150 | 2,150 | 2,150 |
| No. filaments per jet | 34 | 34 | 34 | 34 | 34 |
| Air pressure to jets (p.s.i.g.) | 40 | 30 | 20 | 10 | 20 |
| Type of interlace in product [1] | C-P | C-P | Continuous | | |
| Coherency factor | 62.5 | 62.5 | 45.1 | 5.7 | 28.5 |

[1] C-P signifies a continuously interlaced whole bundle made up o periodically interlaced groups of filaments.

Air has been used as the interlacing fluid in the previous illustrations but other compressible fluids, such as steam, can obviously be used. Liquids can also be used as illustrated in the runs summarized in Table XIII. Much higher pressures are required with a liquid than with a gas to provide high velocity flow. The yarn was 70-34-zero twist 66 nylon and was interlaced with a jet of the type shown in FIGURE 38 having a yarn passage of 0.050 inch diameter and fluid passages of 0.050 inch diameter.

TABLE XIII

| Run | Fluid to jet | Fluid Pres. (p.s.i.g.) | Tension on Yarn (grams) | Yarn Speed (y.p.m.) | Coherency Factor | Type of interlace Produced |
|---|---|---|---|---|---|---|
| 103 | Water | 250 | 10 | 1,000 | 4.8 | Continuous. |
| 104 | do | 500 | 10 | 1,000 | 10.6 | Periodic. |
| 105 | do | 740 | 10 | 1,000 | 17.7 | Do. |

The following examples represent a range of conditions by which staple fibers can be interlaced to form a coherent spun yarn. The jet used is that shown in FIGURE 38—a so-called splash jet where two opposed fluid streams impinge on the yarn from opposite sides of the threadline. The examples clearly show that it is possible to interlace synthetic or natural fibers or blends of fibers. The yarn throughput speed in the following examples was held at 100 y.p.m.

TABLE XIV

| Run | Fiber | Yarn Size | Air Pressure | Coherency Factor |
|---|---|---|---|---|
| 106 | "Orlon" acrylic fiber 1½" | 5.5 wool count | 20 | 200 |
| 107 | do | do | 60 | 300 |
| 108 | 1½" cotton | 9 cotton count | 80 | 300 |
| 109 | cotton/"Dacron" polyester 50/50 | 5 cotton count | 80 | 400 |
| 110 | continuous filament acetate 150/40—wool roving | 3.5 cotton count (approximately) | 80 | 150 |
| 111 | continuous filament acetate 150/40—"Orlon" roving | 7 cotton count (approximately) | 80 | 100 |

In the following table the examples demonstrate the utility of this invention for intermingling metallic filaments. The coherency is necessary in many of the processing steps for metallic filaments where they are used in the making of wire cloth or as reinforcing members or other such conventional uses for highly flexible multifilament metallic yarns. In the following table there are a number of examples showing the interlacing of both continuous and discontinuous metallic filaments. The general conditions are completely analogous to those described elsewhere throughout the specification. The specific conditions are shown in the table.

TABLE XV

| Run | Fiber | Yarn Size | Jet | Air Pressure | Yarn Speed y.p.m. | Coherency Factor |
|---|---|---|---|---|---|---|
| 112 | steel | 6 fils. 0.004″ dia. (approximately 3200 denier). | Fig. 33 | 70 | 200 | 85 |
| 113 | copper | 6 fils. 0.003″ dia. (approximately 3200 deniers), 4 fils. 0.002″ dia. (approximately 3200 denier). | Fig. 38 | 20 | 150 | 7 |
| 114 | do | 12 fils. 0.003″ dia. (approximately 6400 denier), 8 fils. 0.002″ dia. (approximately 6400 denier). | Fig. 38 | 80 | 200 | 20 |
| 115 | 50/50 lead tin alloy. | 4″ staple 0.002″ dia. (approximately 0.3 cotton count). | Fig. 38 | 80 | 20 | 50 |
| 116 | copper | 3″ staple 0.003″ dia. (approximately 0.5 cotton count). | Fig. 38 | 80 | 20 | 85 |

The invention is useful for preparing heavy denier textile yarn for industrial purposes. In run 117, compact interlaced industrial yarn of 1100 denier, composed of 250 continuous filaments of poly(ethylene terephthalate), was prepared by feeding the substantially zero twist yarn at 2870 yards per minute through an interlacing jet, the takeup tension being 200 grams. A jet of the type shown in FIGURE 38 was used having a yarn hole 0.204 inch in diameter and 0.75 inch long, the two air holes being 0.075 inch in diameter and supplied with air under 85 pounds per square inch gage pressure. The interlaced yarn product had an average coherency factor of 40.

In run 118, an interlaced plied yarn was prepared from seven ends of the interlaced yarn of run 117. The seven yarns were fed to the interlacing jet through separate guides to prevent twisting of the bundle interfering with proper interlacing. Snubbing rolls prior to the guides provided uniform feeding. Preferably a guide pin for the plied yarn was used adjacent to the jet to hold the yarn in the most active zone of the jet; this may also help by inducing higher frequency vibrations within the jet. The plied yarn was then taken up at a speed of 300 yards per minute under a total tension of 70–100 grams. An interlacing jet of the type shown in FIGURE 38 was used having a yarn hole 0.282 inch in diameter and 0.75 inch long, the two air holes being 0.075 inch in diameter and supplied with air under 65 pounds per square inch gage pressure. In order to test the coherency of interlacing between yarn ends, the plied yarn was worked to separate it into distinct yarn ends at the point of inserting the hook used in the hook drop test. When determined in this manner the coherency factor was 60 for the ply-interlacing.

*Evaluation of the Frequency of Filament Intermingling Events Per Inch of Length in Yarn*

SUMMARY

The successive cross-sections yarn evaluation method, referred to above in connection with runs 76–85 and hereinafter in the claims, combines a method and means for quantitatively observing yarn structure and recording the frequency of geometrical relationships between filaments and neighboring filaments which are of types providing unity by frictional constraint between filaments. A specimen of multi-filament yarn to be examined is encapsulated between two strips of plastic which are caused to adhere to each other and to the filaments by the use of an adhesive or a solvent; for convenience, the resulting plastic rod is machined to be square in cross-section; extremely thin transverse slices of the rod are removed by rotating knife and the newly exposed end of the rod and the ends of the encapsulated filaments are photographed on motion picture film after each successive slice; after development, the resulting film is projected in a conventional motion picture projector whereupon the behavior of the filaments may be observed and quantitatively assessed. By this procedure, ten 2-inch specimens are preferably evaluated from each sample of yarn so as to obtain an average value which is representative of the whole yarn.

A. ENCAPSULATING YARN SPECIMENS

Prior to selecting ten yarn specimens for evaluation, approximately 1,000 yards are unwound off the sample yarn package so as to expose fresh, clean, undamaged yarn. In selecting the specimens, any unwind arrangement may be used during the take-off operations provided that no twist is imparted to or removed from the yarn and, further, that surface abrasion of the yarn is avoided in the last 100 yards of the package by unwinding at a rate no greater than 50 yards per minute. Each specimen of yarn is prepared identically by being reduced to an essentially zero twist condition and by being subjected to a one-half gram per denier tension before being permanently laminated or encapsulated between resinous or plastic materials. A tension untwist jig, as shown in FIGURE 42, is used to impart tension and remove yarn twist, while a dipping and laminating fixture, as shown in FIGURE 43, applies solvent or adhesive and laminates or encapsulates the specimen and plastic material into a homogeneous block under pressure.

Referring to FIGURE 42, the tension-untwist jig comprises a base 52 with a substantially frictionless separator roll 54 mounted on one end and a horizontally disposed rotatable clamp 53 on the other end. A rectangular slot in the top surface of jig base 52 extends longitudinally between clamp 53 and roll 54.

Referring to FIGURE 43, the dipping and laminating fixture comprises a base 59, a rectangular solvent or adhesive tank 62, a rotating cylindrical drum 58, and a clamping beam 55. The horizontally disposed rotatable drum 58 is mounted on trunnions that are attached to base 59 and is situated above tank 62 so that the bottom surface of drum 58 is immersed in the solvent or adhesive by about 1/16 inch as shown in FIGURE 44. A rectangular slot extends axially along the surface of drum 58 with clamps 60 and 61 disposed at each end of the slot. A clamping beam 55, guided by rods attached to base 59, is disposed parallel to the axis of drum 58.

Referring to FIGURE 42, the following procedure is used in encapsulating yarn specimens. A resinous or plastic strip 2 is inserted into the slot of the jig base 52. A preselected weight is attached to one end of a yarn sample, to accomplish a loading of ½ gram per denier, while the upper end of the yarn is grasped by the operator; the yarn is then manually laid 90° over the roll 54, across the top of the plastic strip 2, and is secured in the rotatable clamp 53 in a line coincident with the axis of the rotatable clamp. During the manipulation of the yarn 1, care is taken to avoid touching it or otherwise disturbing it at points other than the two extreme ends. Yarn 1 is then locally bonded to strip 2 by applying a small quantity of a solvent or adhesive, by means of an eye dropper (not shown) and by manually compressing holding block 56 to that portion of strip 2 nearest roll 54. While observing apparent twist in yarn 1 through a microscope (not shown), clamp 53 is rotated to substantially reduce yarn 1 to a zero twist condition. During the untwist operation, strip 2 is allowed freedom to shift axially in the slot, thus maintaining yarn 1 under constant tension. Similarly, the opposite end of yarn 1, i.e., nearest clamp 53, is locally bonded to strip 2 using holding block 57. Strip 2 with yarn 1 is then removed from the tension-untwist jig and, referring to FIGURE 43, is secured in the slot of drum 58 by clamps 60 and 61 of the dipping and laminating fixture. Drum 58 is then rotated 180° about its axis thus dipping the surface of strip 2 into the solvent or adhesive bath for about 5 seconds. The drum 58 is then rotated 180°, removing strip 2 from the bath, and is allowed to dwell for 10 seconds. A resinous or plastic strip 3 which had previously been lightly cemented to a resilient pad (not shown), within clamping beam 55, is then pressed against strip 2 under a 20-pound uniformly distributed load for not less than two minutes causing the yarn bundle to be flatened into a ribbon-like configuration not more than four filaments thick and causing the strips 2 and 3 to be laminated into a homogeneous block 4. When specimen block 4 has cured sufficiently, it is removed from drum 58; the ends with holding block 56 and 57 are trimmed off and the remainder machined into a rod-like geometry 1/8" x 1/8" x 2 5/8" long.

For nylon and polyester yarns, cellulose acetate may be used for strips 2 and 3 and acetone may be used as the solvent-adhesive; for acetate yarns iso-butyl methacrylate may be used for strips 2 and 3 in association with toluol as the solvent-adhesive.

B. MECHANICAL APPARATUS

The apparatus for cutting, viewing, and photographing yarn samples is comprised generally of a knife mounted on the spindle of a precision bench lathe, means for mounting an encapsulated yarn specimen, means for advancing the specimen into the knife, and an optical-photographic system all of which are described in detail below. This apparatus is shown in the following figures:

FIGURE 46 shows an isometric view of a yarn specimen holder or collet, partly in cross-section; a means for advancing the specimen through the holder, and a lathe compound slide rest upon which these elements are mounted.

FIGURE 48 shows an isometric view of the specimen, the specimen holder, a knife, a portion of an optical system and a portion of a lathe upon which the foregoing are mounted.

Figure 41:
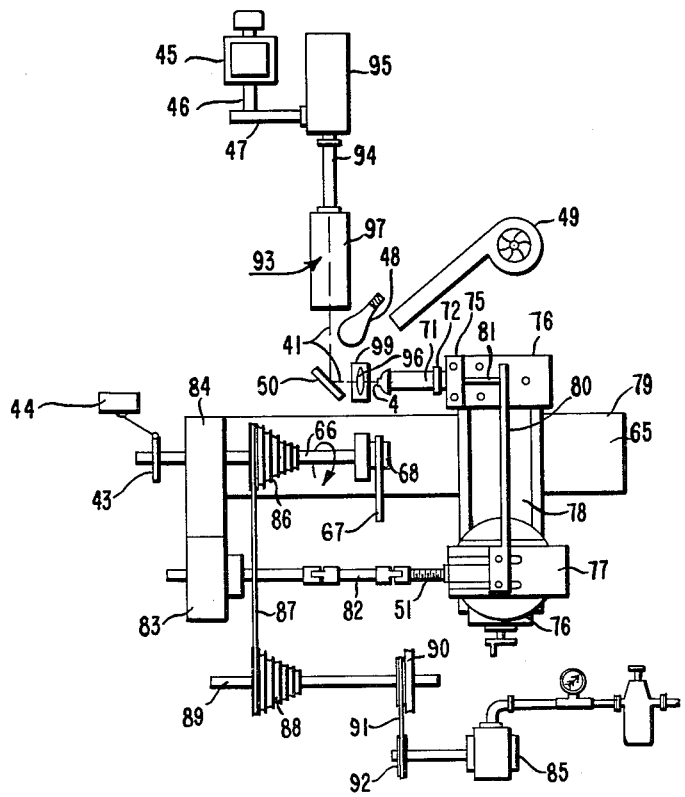
FIGURE 41 shows a schematic plan view of substantially all elements of the apparatus.
Figure 42:
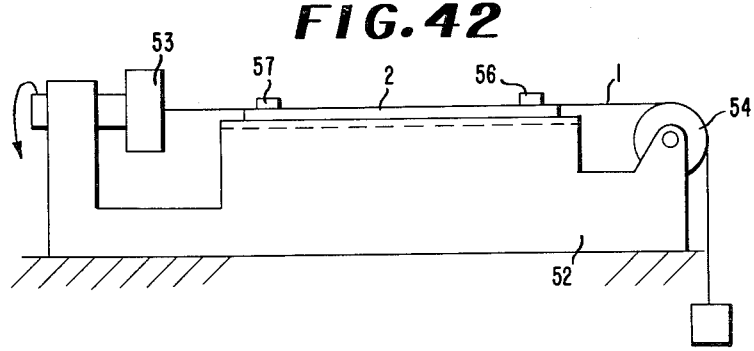

As shown in FIGURE 41, the rotating spindle 66 on lathe 65 carries a microtome knife 67 which is secured to a faceplate on spindle 66 by a brass bracket 68 by means of two socket head cap screws (not shown). Referring to FIGURES 41 and 46, adjacent to and parallel to the axis of spindle 66, is an encapsulated yarn specimen, generally designated as block 4; the block 4 is held within a collet 69 (to be described in detail below) which is threadedly engaged on its far end into collet holder 75 which in turn is secured by a pair of socket head cap screws to lathe slide 76. The lathe slide 76 is transversely adjustable with respect to the lathe bed 79 and with respect to the axis of spindle 66. At the end of the slide 76 opposite from that which holds holder 65 is situated a slide 77 comprising a conventional dovetail slide arrangement and a lead screw 51; the slide 77 is advanced by the lead screw 51 and capable of a two-inch stroke parallel to the axis of spindle 66. Both of the slides 76 and 77 are combined into an integral unit, hereinafter described as compound slide rest 78, which is mounted on lathe bed 79. The compound slide rest 78 may be shifted manually along the lathe bed 79 toward or away from the end of spindle 66; when it is appropriately located, the compound slide rest 78 may be clamped to the lathe bed 79 by a locking device (not shown).

An arm 80 is attached to the top of slide 77 and is disposed transverse of the lathe bed; at its extreme end, one side of the arm 80 lies in abutment with the end of a rod 81 which rod is coaxial with the collet holder 75 and collet 69. The end of the rod 81 which is within the collet 69 is in axial abutment with the yarn specimen block 4 and is adapted to advance the yarn specimen block when slide 77 is advanced by the rotation of lead screw 51. Referring to FIGURE 41, the lead screw 51 is connected by a shaft 82 to an automatic screw attachment 83 or gear box which is drivingly engaged with spindle 66 through a reduction gear train 84; for each revolution of spindle 66, gear train 84 and screw attachment 83 will cause slide 77 to be advanced toward the rotating knife 67, in effect, moving the end of specimen block 4 out of the end of the collet 69.

A variable speed air motor 85 is adapted to drive spindle 66 by means of a pair of pulleys 90 and 92 connected to a belt 91; the pulley 90 is mounted on an idler shaft 89 in suitable bearings (not shown) which idler shaft also carries a pulley 88. The spindle 66 also carries a pulley 86 which is drivingly engaged to the pulley 88 by means of belt 87.

On the free end of spindle 66 is located a single lobed cam 43 in operative engagement with an arm on an electrical switch 44; in operation, the switch will be closed once for each revolution of the spindle 66. This cam may be replaced by a multi-lobe cam as described below, if desired.

The collet 69 which holds the specimen block 4 is of conventional design being slotted on its free end in two radial planes at 90° to each other; at the free end of the collet, a conical portion on its outer periphery is engaged by a sleeve 71 having a matching internal cone. A ring nut 72, threadedly engaged on the collet 69, is adapted to urge the matching cones together thus collapsing the slotted end of the collet upon the yarn specimen block 4 and gripping it in the region of the 1/8" square cross-section hole which, of course, matches the cross-section of the yarn specimen block 4. The 1/8" square hole extends into the collet about 1/4", opening into a large diameter space which is occupied by a pair of half-round inserts, 73 and 74, shown in section in FIGURE 47, which are each provided with symmetrical grooves extending longitudinally along their flat faces thus forming a square cross-section slot which is aligned with the square hole in the free end of the collet; the slot assists in guiding the yarn specimen block 4 and the rod 81. At its free end, the collet terminates in a planar face 70 which is precisely at a right angle to the collet axis.

C. OPTICAL AND PHOTOGRAPHIC APPARATUS

Referring to FIGURES 41 and 48, a modified epi type achromatic microscope 93 is disposed at 90° to the cross-section face of yarn specimen block 4 and magnifies a specimen cross-section image to 126X; the microscope 93 is optically connected to a camera 95 by means of optical tube 94. Beginning at a point 5/8 inch away from collet face 70, on its centerline axis, is an objective lens 96 (removed from microscope body 97) which is threaded into brass tube 98 which fits adjustably into a machined cavity of lens support 99.

Behind lens 96, cemented to a vertical face machined at 45° to optical axis 41 on support 99, is a 1 3/8 inches wide by 2 inches long by 5/16 inch thick mirror 50 which bends 90° toward microscope body 97 the optical axis 41. Two socket head cap screws (not shown) threaded into support 99 secure it to plate 42 which is adjustably bolted by two socket head screws threaded into lathe bed 79.

Microscope body 97 containing the remaining lens system is horizontally positioned and is adjustable longitudinally, along the bent optical axis 41, on a gear and rack type of base (not shown). This movable mounting allows for fine adjustment of the magnified image of the specimen cross-section.

Referring to FIGURE 41, the camera is a 16 mm. motion-picture type, adapted for the exposure of single frames of film when a shutter release button (not shown) is moved and subsequently returned to a "stop" position. An aluminum bracket 47 is attached to the camera shutter release button and is likewise attached to the armature 46 of a solenoid 45 which latter is connected to a source of electrical power through switch 44.

One Sylvania DC A "truflector" projector lamp 48 illuminates the specimen cross-section. A mounted hair dryer type blower 49 cools the yarn specimen block 4 and clears away loose chips that might interfere with properly photographing each newly exposed specimen cross-section.

D. OPERATION

A yarn specimen block 4, having been suitably encapsulated and otherwise prepared, is inserted into the collet 9 which is then suitably adjusted for the proper degree of grip. The compound slide rest 78 is manually shifted toward spindle 66 and knife 67 until the outside face or leading edge of the knife 67 is clear of the planar face 70 of collet 69 by about 0.001" to 0.005"; the slide rest 78 is then secured to the lathe bed 79 so that in subsequent operations collet 69 remains stationary. The air motor 85 is started causing various elements to rotate and causing the knife blade 67 to remove a slice from the end of yarn specimen block 4. The cam 43 is so disposed in respect to the knife blade 67 that it actuates the switch 44, after the knife blade 67 has cleared the optical path, thus energizing solenoid 45 and causing the exposure of a single frame of film. Likewise, successive revolutions of the spindle 66 result in successive cuts of the yarn specimen block each followed by an exposure of one frame of film.

If desired, the cam 43 may be replaced by one having two or more lobes such that two or more frames of film are exposed each time a yarn cross-section is sliced. The entire operation proceeds until a 2-inch long yarn specimen block is consumed.

The rate of advance of 0.00064" of the yarn specimen is used primarily for yarns having a high degree of modification, i.e., a yarn wherein a considerable amount of filament migration can be expected. Alternatively, change gears may be used to vary the rate of feed of the yarn specimen block; 0.002" is commonly used.

E. QUANTITATIVE ASSESSMENT OF RESULTS

As described above, in a length of multifilament yarn which has been encapsulated, the filaments are arrayed in a ribbon-like form generally two to three filaments thick, this form being preferred in order to assess the geometrical relationships between filaments most conveniently. The degree of modification of a yarn bundle (or lack thereof) may be quantitatively measured in terms of the apparent migration of filaments in respect to their neighboring filaments. In producing interlaced yarns, filaments may be generally thrust between other groups or pairs of filaments or filaments may be rotated about other single filaments or groups of filaments; thus, when successive cross-sections of a yarn bundle are viewed, it is an object to observe and count the changed geometrical relationships that are indicative of such filament perturbations.

Figure 49:
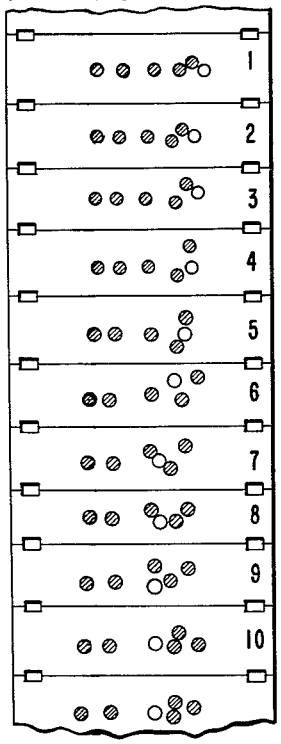
Figure 50:
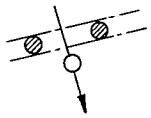
Figure 53:
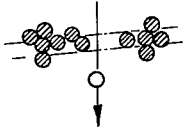
Figure 58:
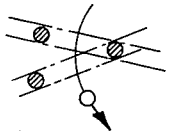
Figure 59:
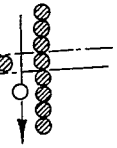
Figure 60:
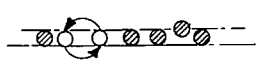
Figure 62:

The changing geometrical relationships between filaments will be described with reference to the drawings; FIGURE 49 depicts a typical series of photographs of successive yarn cross-sections; FIGURES 50 through 59 show various kinds of filament migrations that are included in a quantitative count of "Events" and FIGURES 60 and 62 show filament or yarn disturbances that are not counted as "events." Basically, four kinds of filament behavior qualify as tabulatable "events":

(1) *Single, moving, filaments, single events.*—One event is counted if, in starting from or passing through an initial position wholly outside the area bounded by a pair of tangents external to a nominally stationary pair of filaments, a moving filament passes between the nominally stationary filaments, and reaches or passes through a position outside the same area but on the side opposite that from which it started, whereupon an event is complete; the pair of filaments are taken as those that are nearest to the moving filament at the instant the center of the moving filament crosses the line joining the centers of the pair of filaments and an external tangent is defined as one that does not intersect a line common to the centers of the nominally stationary filaments. Refer to FIGURES 50, 53 and 59.

Figure 51:
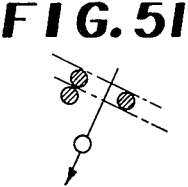
Figure 54:
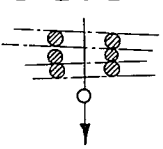
Figure 55:
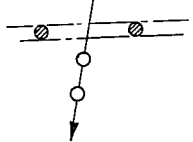

(2) *Single, moving filaments—successive events.*—In counting successive events by a single, moving filament, a given event must have been completed (as defined in (1), above) before the next successive event may start. FIGURE 54 shows 2 successive events, wherein FIGURES 51 and 58 show single events.

Figure 52:
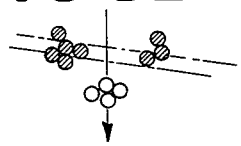

(3) *Plural, moving filaments—plural events.*—Two or more events are counted if two or more moving filaments (including bundles of filaments) behave as in 1, above, without regard to the sense of direction of the moving filaments (i.e., the moving filaments may move in the same direction or in opposite directions). FIGURE 52 shows 4 events and 55 and 57 show 2 events.

Figure 56:
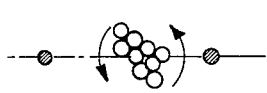
Figure 57:
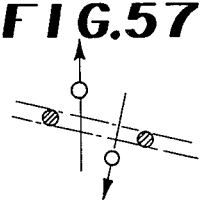

(4) *Rotating groups of filaments.*—When a more-or-less compact yarn bundle, defined as one wherein filament-to-filament spacing generally does not exceed one filament diameter, undergoes rotation in whole or in part, while situated in proximity to one or more relatively stationary filaments which are either grouped or located randomly about the bundle, an event is counted each time a moving filament, located on the periphery of the bundle, enters between a stationary filament and the bundle and subsequently passes beyond a line joining the centers of the stationary filament and the bundle; in counting successive events by a single, moving filament, a given event must have been completed before the next successive event may start. Refer to FIGURE 56.

Figure 61:
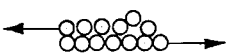

Filament behavior which does not qualify as a tabulatable event includes:

(1) Filaments which merely exchange positions (FIGURE 60);

(2) Filaments which migrate individually or en masse more-or-less laterally or in the plane of the bundle ribbon (FIGURE 61); and (3) Filaments which move between spaced filaments but do not move completely beyond external tangents to the spaced filaments (FIGURE 62).

Since many different embodiments of the invention may be made without departing from the spirit and scope thereof, it is to be understood that the invention is not limited by the specific illustrations except to the extent defined in the following claims.

This application is a continuation-in-part of application Serial No. 68,130, filed November 8, 1960, now U.S. Patent No. 2,985,995, granted May 30, 1961, which is in turn a continuation-in-part of our application Serial No. 752,451, filed August 1, 1958, and now abandoned.

We claim:

1. The process for preparing a compact interlaced multifilament textile yarn which comprises continuously feeding a multifilament yarn bundle under tension through a plural vortex turbulent zone formed by a fluid jet, jetting the fluid with a force which separates the yarn bundle into multiple groups of one or more filaments, causing the separated groups to oscillate between vortices at successive positions along the yarn to intermingle the filaments as the yarn passes through the turbulent zone, and withdrawing the filaments from the turbulent zone under a tension that forms a yarn bundle essentially consisting of closely adjacent filaments free from ring-like and other loops, the filaments being randomly intermingled with adjacent filaments anad groups of filaments along the yarn to maintain the unity of the yarn by frictional constraint between the filaments.

2. The process for preparing a compact interlaced multifilament textile yarn which comprises continuously feeding a multifilament yarn bundle essentially consisting of continuous filaments through the turbulent zone of a fluid jet and between guiding means positioned before and after the jet, applying fluid velocity gradients of sufficient force across the yarn bundle in the turbulent zone to separate the yarn bundle into multiple groups of one or more filaments, returning the filaments toward the center line of the main yarn bundle under tension where the filaments are again separated by the velocity gradients so that the filaments oscillate at high speed and are intermingled during passage through the turbulent zone, and withdrawing the filaments from the turbulent zone under a tension that forms a yarn bundle of closely adjacent filaments free from ring-like and other loops.

3. The process for preparing a compact interlaced multifilament textile yarn which comprises continuously feeding a multifilament yarn bundle essentially consisting of continuous filaments through the turbulent zone of a fluid jet which provides fluid velocity gradients across the filament bundle, applying a tension of 0.01 to 1.0 gram per denier to the yarn between guiding members positioned before and after the turbulent zone in alignment therewith, jetting the fluid at a velocity which separates the yarn bundle into multiple groups of one or more filaments, causing the groups to oscillate rapidly during passage between the guiding members by relative adjustment of yarn tension and fluid velocity to produce interlacing of the filaments while avoiding formation of ring-like and other loops, and withdrawing the yarn from the turbulent zone under a tension that forms a bundle of closely adjacent intermingled filaments free from ring-like and other loops.

4. The process for preparing a compact interlaced multifilament textile yarn which comprises continuously feeding a multifilament yarn bundle essentially consisting of continuous filaments through a high velocity stream of fluid which provides steep velocity gradients across the yarn filament bundle, guiding the yarn to pass through the stream near the center when the yarn is straight, maintaining a tension of 0.01 to 1.0 gram per denier on the yarn to produce self-induced oscillation wherein the stream pushes the yarn filaments away and the tension returns the filaments toward the center of the stream, said oscillation having a frequency of at least 25 cycles per second to provide filament intermingling action, and withdrawing the yarn from the stream under a tension that forms a yarn bundle of closely adjacent filaments, free from ring-like and other loops, held together by frictional constraint between intermingled filaments.

5. The process defined in claim 4 wherein oscillating filaments are passed closely adjacent to a solid surface to produce random rotation, thereby introducing individual filament twist, and converging the filaments under sufficient tension to untwist in contact with other filaments to produce intermingling.

6. The process for preparing a compact interlaced multifilament textile yarn which comprises continuously feeding a multifilament yarn bundle over a solid surface, directing a pair of high velocity fluid streams to converge toward the yarn and impinge on the surface, imparting sufficient velocity to the streams to separate and then intermingle filaments and groups of filaments of the yarn bundle, and withdrawing the filaments from the fluid under sufficient tension to reassemble the filaments into a yarn bundle held together by frictional constraint between intermingled filaments and essentially consisting of closely adjacent filaments free from ring-like and other loops.

7. The process for preparing a compact interlaced multifilament textile yarn which comprises feeding a multifilament yarn essentially consisting of continuous filaments through a fluid stream having an inner high velocity portion of at least ¼ sonic velocity and steep decreases in velocity at each side across the yarn path, guiding the yarn to vary the positions of filaments in the stream in and out of the high velocity portion at a frequency in excess of 25 cycles per second to produce alternate and random twisting of filaments and groups of filaments, converging the filaments and groups of filaments downstream under sufficient tension to untwist in frictional contact with intermingling, and withdrawing the yarn from the stream under a tension that forms a yarn bundle of closely adjacent filaments, free from ring-like and other loops, held together by frictional constraint between intermingled filaments.

8. The process for preparing a compact interlaced staple fiber textile yarn which comprises continuously feeding a staple fiber bundle under tension through a plural vortex turbulent zone of a fluid jet and between guiding means positioned before and after the jet, jetting the fluid with sufficient velocity to separate and then intermingle fibers and groups of fibers, and withdrawing the fibers from the turbulent zone under a tension that forms a compact coherent yarn of closely adjacent fibers substantially free from ring-like and other loops.

9. The process for preparing a compact textile yarn of at least two plies interlaced together which comprises continuously feeding a plurality of distinct multifilament yarn bundles essentially consisting of continuous filaments through the turbulent zone of a fluid jet which provides fluid velocity gradients across the yarn bundles, jetting the fluid with sufficient velocity to separate the yarn bundles into multiple groups of one or more filaments, maintaining sufficient tension on the yarn bundles to cause the filament groups to oscillate and become intermingled between yarn bundles without formation of ring-like and other loops, and withdrawing the resulting interlaced plied yarn from the turbulent zone under a tension that forms a compact unitary structure free from ring-like and other loops.

References Cited in the file of this patent

UNITED STATES PATENTS 2,869,967   Breen _____ Jan. 20, 1959

FOREIGN PATENTS 554,150   Canada _____ Mar. 11, 1958